United States Patent
Chesnokov

(10) Patent No.: US 7,302,110 B2
(45) Date of Patent: Nov. 27, 2007

(54) IMAGE ENHANCEMENT METHODS AND APPARATUS THEREFOR

(76) Inventor: Vyacheslav Chesnokov, 162-168 Regent Street, London (GB) W1B 5TD ( * ) Notice: Subject to any disclaimer, the term of this patent is extended or adjusted under 35 U.S.C. 154(b) by 575 days.

(21) Appl. No.: 10/476,587

(22) PCT Filed: Apr. 10, 2002

(86) PCT No.: PCT/GB02/01675

§ 371 (c)(1),
(2), (4) Date: Jun. 7, 2004

(87) PCT Pub. No.: WO02/089060

PCT Pub. Date: Nov. 7, 2002

(65) Prior Publication Data

US 2004/0213478 A1    Oct. 28, 2004

(30) Foreign Application Priority Data

May 2, 2001    (GB) ................................. 0110748.1

(51) Int. Cl.
*G06K 9/40* (2006.01)
(52) U.S. Cl. .................... 382/264; 382/232; 382/233
(58) Field of Classification Search ............... 382/232, 382/233, 261, 308, 276, 260, 264, 274, 210; 345/555, 20, 60, 77; 348/384.1, 440.1; 358/426.1, 358/426.16; 375/122, 240.1
See application file for complete search history.

(56) References Cited

U.S. PATENT DOCUMENTS 5,020,120 A * 5/1991 Weldy ......................... 382/240
5,467,404 A * 11/1995 Vuylsteke et al. ............ 382/274
5,805,721 A * 9/1998 Vuylsteke et al. ............ 382/128
5,959,696 A    9/1999 Hwang ......................... 348/678
5,991,456 A    11/1999 Rahman et al. .............. 382/254
6,760,487 B1 * 7/2004 Linares ......................... 382/275
7,110,046 B2 * 9/2006 Lin et al. ...................... 348/679

(Continued)

FOREIGN PATENT DOCUMENTS

JP    10108186 A * 4/1998

(Continued)

OTHER PUBLICATIONS

Jobson, D.—"A Multiscale Retinex for bridging the gap between color images and the human observation of scenes"—IEEE—vol. 6, issue 7, Jul. 1997, pp. 965-976.*

(Continued)

*Primary Examiner*—Jingge Wu
*Assistant Examiner*—Bernard Krasnic
(74) *Attorney, Agent, or Firm*—David R. Yohannan; Kelley Drye & Warren, LLP

(57) ABSTRACT

The invention relates to methods, devices and computer programs for processing images. The dynamic range of an image is adjusted to allow more detail in the original image to be reproducible, whilst preserving the natural look of the image. Improvements to lossy data compression/decompression algorithms are proposed which include elements of spatial non-uniformity, for example modifying relatively dark portions of an image to a greater extent than relatively bright portions of the image. The algorithms may be made reversible by storing parameters describing the compression process with a compressed image, which can then be used to reverse the process when decompressing the image.

23 Claims, 19 Drawing Sheets

U.S. PATENT DOCUMENTS 7,120,303 B2 * 10/2006 Mitchell et al. ............ 382/239
2004/0066850 A1 * 4/2004 Nakajima et al. ...... 375/240.19

FOREIGN PATENT DOCUMENTS

JP         11088879 A    3/1999

OTHER PUBLICATIONS

Chesnokov, V.—"A new adaptive architecture: Analog synthesiser of orthogonal functions"—IEE—May 1999, pp. 714-719.*
Chesnokov, V.—"Analog Synthesiser of orthogonal signals"—IEEE—vol. 47, issue 2, Feb. 2000, pp. 125-132.*
Chesnokov, V.—"Fast training analog approximator on the basis of Legendre polynomials"—IEEE—Aug. 1996, pp. 299-304.*
Kumaran, M. & Umbaugh, S.E., "A Dynamic Window-Based Runlength Coding Algorithm Applied to Gray-Level Images", *Graphical Models and Image Processing*, vol. 57(4), Jul. 1995, pp. 267-282.
Pratt, William K., "Digital Image Processing", John Wiley & Sons, 1978, pp. 307-318.

* cited by examiner

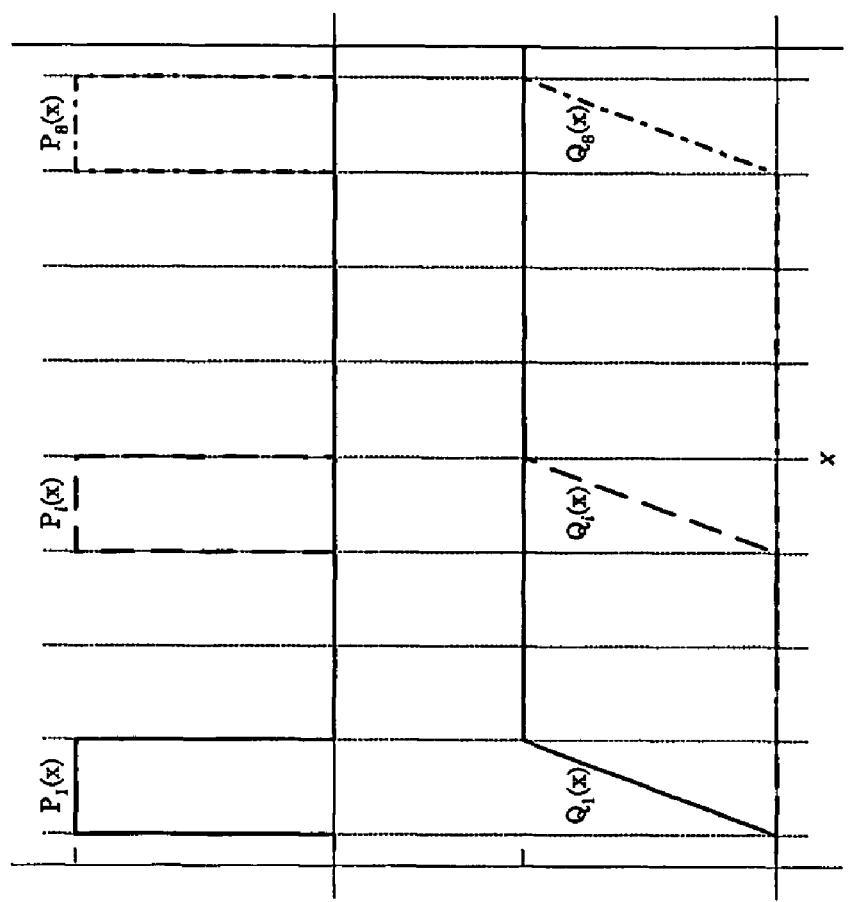
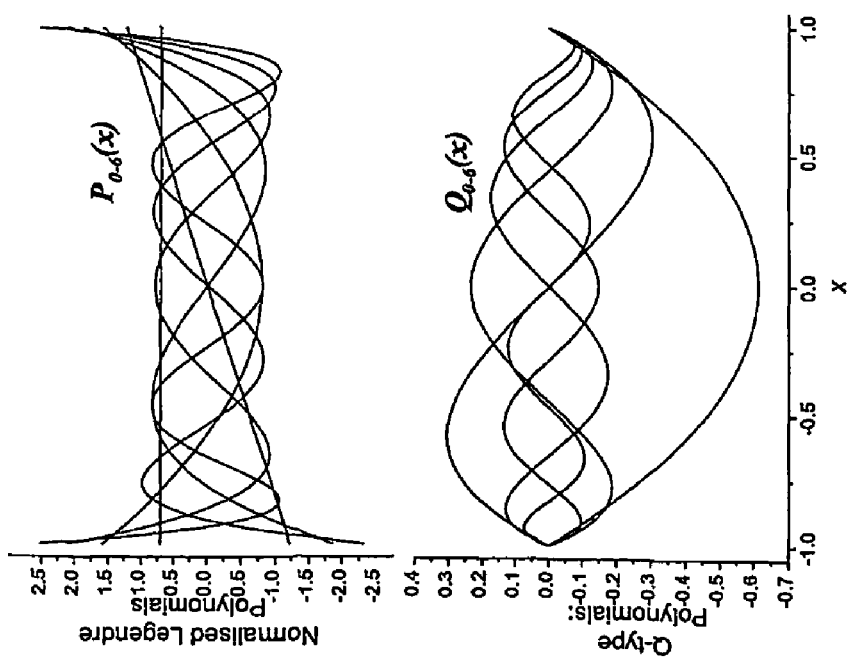
Figure 3(b)
Figure 3(a)

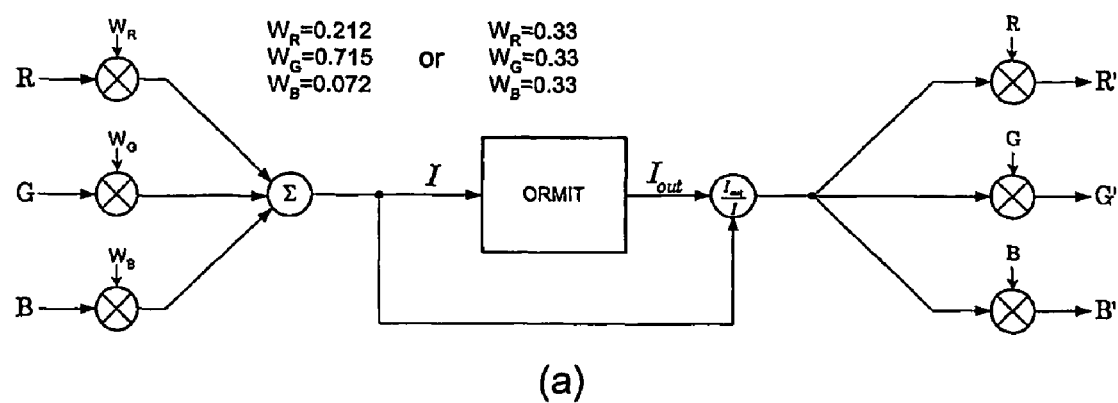
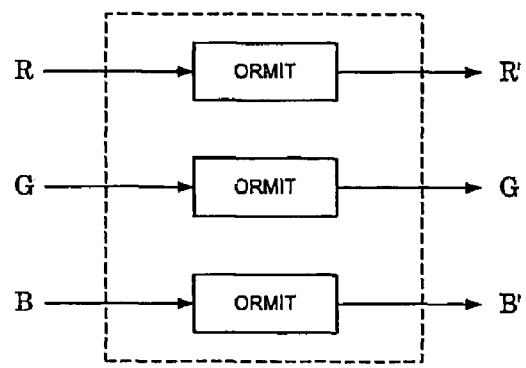
Figures 4(a) and (b)

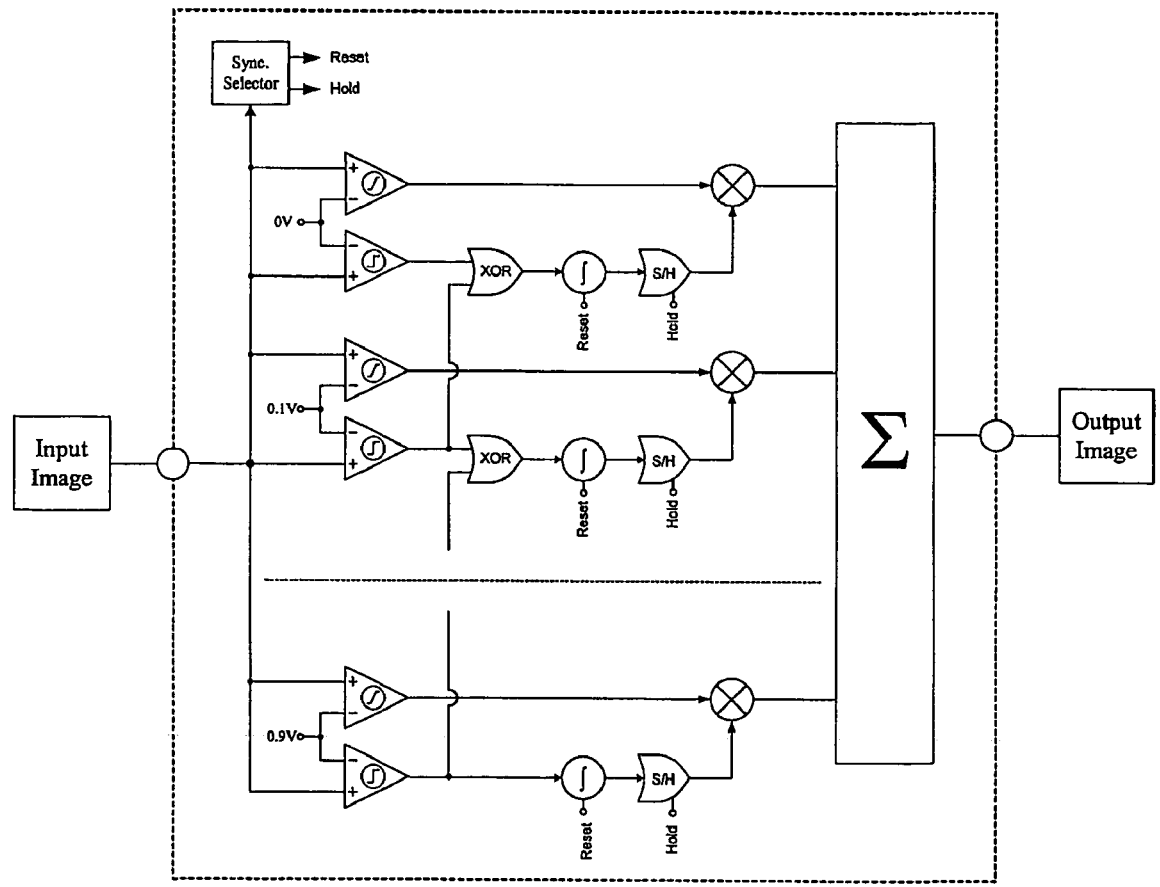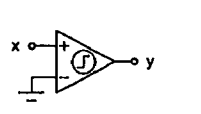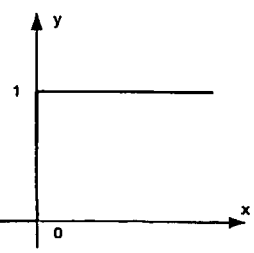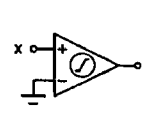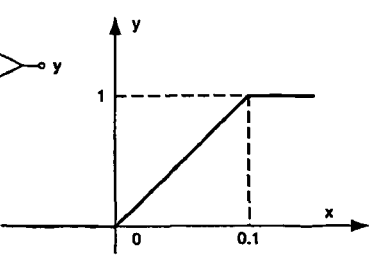
Figure 18

IMAGE ENHANCEMENT METHODS AND APPARATUS THEREFOR

CROSS-REFERENCE TO RELATED APPLICATIONS

The present application relates to, claims priority on, and is a national application filed under 35 U.S.C. § 371 of prior international patent application PCT/GB02/01675 filed Apr. 10, 2002, which is hereby incorporated by reference in its entirety.

FIELD OF THE INVENTION

The invention relates generally to image processing, and more particularly to image improvement. The invention may be used for dynamic range compression and colour constancy for images both in digital and analogue form. In one aspect, the invention relates to image data compression.

BACKGROUND OF THE INVENTION

Dynamic range is the ratio between intensities of the brightest and darkest recordable parts of an image or scene. A scene that ranges from bright sunlight to deep shadows is said to have a high dynamic range, while indoor scenes with less contrast will have a low dynamic range. Note that depending on the scene contrast, it may or may not be possible to capture the entire range with a digital camera. In recording scenes with very high dynamic range, digital cameras will make compromises that allow the capture of only the part of the scene that is most important. This compromise is needed because no camera or output device of any kind (including the human eye) can reproduce the nearly infinite dynamic range that exists in real life.

In an input image which contains a level of background noise, the noise level defines the darkest part of the image for the purpose of the dynamic range. Amplifying the brightness of the darkest parts of an image containing noise tends to decrease the dynamic range, as the darkest meaningful parts of the image, defined by the noise level, are increased in brightness.

Electronic cameras, based on CCD detector arrays, are capable of acquiring image data across a wide dynamic range on the order to 2500:1. This range is suitable for handling most illumination variations within scenes (such as high contrast scenes taken on a sunny day). Typically though, this dynamic range is lost when the image is digitised, compressed by a lossy compression algorithm (like JPEG or MPEG) or when the much narrower dynamic ranges of print and display media are encountered. For example, most images are digitised to 8-bit/colour band (256 grey levels/colour band) and most displays and print media are even more limited to a 50:1 dynamic range.

It would be desirable to try to find some transform which can compress the dynamic range of an image to allow more detail in the original image (which may be colour or non-colour, still or video) to be reproducible, while preferably preserving the natural look of the transformed image. Let us call such a transform an "image improvement transform".

Since it is important to be able to improve images (video) in real time the computational efficiency is an important parameter of image improvement systems. To provide low power consumption, smallness in size and the low cost of an integrated circuit (IC) or other device implementing an image improvement algorithm, it would be desirable to provide an analogue implementation of an image improvement algorithm. Another advantage of an analogue implementation of image improvement algorithm is that would allow the avoidance of the addition of digitising noise caused by analogue to digital conversion (ADC).

It would also be desirable to provide an improvement to lossy data compression algorithms such as JPEG, to allow a greater amount of manipulation of compressed/decompressed images.

Let us consider the current popular image enhancement algorithms.

Homomorphic filtering is an image enhancement technique which uses the following algorithm:

$$I_{out} = \exp[HPF_\Omega(\log(I))] = \exp[\log(I) - LPF_\Omega(\log(I))],$$

where HPF is a high-pass 2D spatial filter function.

U.S. Pat. No. 5,991,456 describes an image enhancement algorithm system named Retinex™. This uses the following algorithm:

$$I_{out} = \sum_{i=0}^{N} W_i(\log(I) - \log(LPF_{\Omega_i}(I))),$$

where $W_i$ are constants.

A disadvantage of this algorithm is that it is incapable of optimisation of the high-frequency (spatial) components $$\left(\text{with frequencies higher than } \max_{i=1,\ldots,N}(\Omega_i)\right)$$

of an image, thus sharp transitions between dark and bright regions of an image will exist on the transformed image. Thus a disadvantage of the Retinex algorithm is the excessive contrast of small high-contrast details of images. A further disadvantage is its computing power requirements. Typically, image processing takes hours on a conventional computer workstation. Therefore, Retinex is ill-suited to most practical applications Techniques known as histogram modification (or equalisation) algorithms are also known. There are many histogram modification algorithms. Such algorithms modify the transfer function H(..) of the whole image:

$$I_{out}(x, y) = H(I(x, y)).$$

More particularly, histogram equalisation (cumulative histogram-based) as well as other histogram modification-based algorithms may be described using the following equation:

$$I_{out} = \frac{1}{M} CumHistogram(I)$$

$$= \sum_{i=0}^{N} \theta(I - I_i)\langle\delta(I - I_i)\rangle$$

$$\equiv \sum_{i=0}^{N} \theta(I - I_i) \frac{1}{M} \sum_{k,l} \delta(I(k, l) - I_i(k, l)),$$

where M is the number of pixels in the image I, $I_i$ are the levels of grey (e.g. in case of grayscale images N=255, $I_0=0$, $I_1=1, \ldots, I_{255}=255$), $$\delta(x) = \begin{cases} 1 & \text{if } x = 0 \\ 0 & \text{if } x \neq 0 \end{cases}, \theta(x) = \begin{cases} 1 & \text{if } x \geq 0 \\ 0 & \text{if } x < 0 \end{cases},$$

and (k,l) are the pixel coordinates. The averaging operation ⟨..⟩ could be considered as the low-pass filtering $LPF_\Omega$ with the cut-off frequency $$\Omega = 0, \text{ so } I_{out} = \sum_{i=0}^{N} \theta(I - I_i)LPF_0(\delta(I - I_i)).$$

Histogram equalisation algorithms can be limited in utility in cases when the histogram of the whole image is uniform, whereas some parts of the image are too bright and the others are too dark. In such cases different transfer functions should be applied to different regions of images.

Local histogram equalising (also referred to as adaptive histogram equalising) techniques are also known. The techniques are adaptive in the sense that in different regions of a picture different transforms are applied to equalise the histogram of each particular region. There are many implementations, which can be represented by the formula:

$$I_{out} = \sum_{i=0}^{N} \theta(I - I_i)LPF_\Omega(\delta(I - I_i)),$$

where $\Omega$ is the spatial frequency related to the size of regions with equalised histogram (if the size of "window" is r, the size of an image is L, than $$\Omega = \frac{L}{r}).$$

However, known local histogram equalisation (adaptive histogram equalisation) techniques are highly computationally intensive and difficult to embody in real time applications. Furthermore, in many cases a rectangular window around each pixel is used for histogram equalisation in this window, thus such transforms cannot be considered as spatially smooth. Such non-smoothness of a transform could increase the noise and artefacts of transformed images.

It is an object of one or more aspects of the present invention to provide a method of improving an image. Preferably, the image may be created with digital or analogue data. Preferably, the method should be suitable for application to both colour and non-colour images.

Another object of one or more aspects of the present invention is to provide a method of improving images in terms of dynamic range compression, colour independence from the spectral distribution of the scene illuminant, and colour/lightness rendition.

Another object of one or more aspects of the invention is to provide analogue implementations of the suggested image improvement algorithm. Such implementations will generally be small sizes and have low power consumption, which are desirable characteristics in many image capture devices.

Still another object of one or more aspects of the invention is to improve lossy image compression procedures, such that after compression-decompression images can retain a relatively wide dynamic range, which is important if certain types of post-processing are to be performed, for example in medical image processing techniques (such as those used in X-ray and Magnetic Resonance Imaging (MRI) scans) or in the manipulation of photographic images using image editing software.

In accordance with one aspect of the present invention, there is provided an image processing method comprising the step of processing an input signal to generate an adjusted output signal, wherein the intensity values I(x,y) for different positions (x,y) of an image are adjusted to generate an adjusted intensity value I'(x,y) in accordance with:

$$I_{out} = \Sigma_{i=0}^{N} \alpha_i(I)LPF_{\Omega_i}[P_i(F(I))] \cdot Q_i(F(I)) \cdot Q_i(F(I)) + \beta(I),$$

where $P_i(\gamma)$ is an orthogonal basis of functions of $\gamma$ defined in the range $0 < \gamma < 1$; and $Q_i(..)$ are antiderivatives of $P_i(..)$: $Q_i(F(I)) = \int_0^{F(I)} P_i(\eta) d\eta$ or an approximation thereto, $LPF_\Omega$ [..] is an operator of low-pass spatial filtering; a $\Omega_i$ is a cut-off frequency of the low-pass filter, and $F(..)$ is a weighting function.

The family of possible transforms, which could be represented by the above algorithm, are referred to herein as the Orthogonal Retino-Morphic Image Transform (ORMIT).

The functions $Q_i(..)$ may be approximations to the antiderivatives of $P_i(..)$ within a range of 25%, more preferably 10%, of variation from the antiderivatives. $\Omega$ is preferably non-zero. $F(..)$ preferably varies with I in an asymmetrical manner, $\beta(I)$ is preferably not equal to zero. $\Omega_i$ is preferably different for different i such that the transformation has a different degree of spatial nonuniformity in different brightness domains.

The image improvement algorithm is preferably asymmetric in the brightness domain, such that the algorithm has a greater effect on dark regions of an image than relatively bright regions. The algorithm preferably performs dynamic range compression so as to displace relatively dark portions of the image within the range of intensity values to a greater extent than relatively bright portions, thereby achieving this asymmetry. The image contrast in the dark regions is preferably also increased to a greater extent than that in the light regions. The effect of this is to mimic the behaviour of the human eye, which has a relatively high dynamic range extending well into the dark regions of an original image, by reproducing these dark regions in a lighter region of the reproduced image. Furthermore, when used, reversibly, in combination with a standard lossy compression technique, as will be described in further detail below, the dynamic range compression functions to increase the amount of useful data retained in the dark regions of an image. Since the human eye has a very high dynamic range (apprx. $10^5$:1) whereas the dynamic range of the optic nerve is about 100:1, it is clear that the eye performs a transform which strongly compresses the dynamic range.

The algorithm according to this aspect of the invention preferably includes an element of spatial nonuniformity in the transfer function which is applied to the image. That is to say, the transfer function may vary across the image, as in the case of local histogram equalisation.

Furthermore, the shape of the transfer function applied is preferably nonlinearly adaptive in the spatial domain. That is to say, the transfer functions which are applied in different parts of the image need bear no relation to one another in shape, to improve the handling of contrast present in an original image. The transform preferably makes use of orthogonal functions, thereby to improve computational efficiency. The orthogonal functions are in one embodiment Legendre polynomials, in another piecewise linear mapping functions. These transforms are preferably carried out in the analogue domain.

The algorithm is preferably smooth both in the brightness domain and the spatial domain.

A further preferred characteristic of the algorithm is reversibility.

According to a further aspect of the invention there is provided a method of compressing an image signal, comprising conducting a reversible dynamic range compression algorithm to transform the image signal to an enhanced image signal, and conducting a lossy compression algorithm to compress the enhanced image signal to generate compressed image data.

The method preferably comprises generating parameters relating to the dynamic range compression algorithm, and storing same in combination with the compressed image data.

According to a yet further aspect of the invention there is provided a method of decompressing compressed image data, comprising conducting a decompression corresponding to a lossy compression algorithm, and conducting a reverse dynamic range compression algorithm to provide a decompressed image signal.

In one embodiment, a dynamic range compression algorithm is used reversibly in combination with a standard lossy compression technique (such as JPEG), with parameters describing the image improvement transform accompanying the compressed image data to enable the reverse transform when decompressing the image. In this sense, the algorithm is to be considered "reversible" if the amount of data describing the reverse transform is not significantly greater than the amount of standard image compression data. Preferably, the amount of transform data is significantly less than, i.e. less than half the amount of, the standard image compression data. In one embodiment, the transform data is inserted in a header part of the compressed image file.

In a preferred embodiment, the intensity value I(x,y) for each position (x,y) of a greyscale image is adjusted to generate an intensity value $I_{out}(x,y)$ (improved image) for each position in accordance with $$I_{out} = \alpha \cdot \Sigma_{i=0}^{N} LPF_{\Omega}[P_i(F(I))] \cdot Q_i(F(I)) + (1-\alpha)I$$

Here α is the "strength" of transform, which is preferably, in the case of image enhancement between 0 and 1. Typically, α may take a value in the region of 0.5. The nonuniformity parameters $\Omega_i$ may take different values for different i to achieve best enhancement while retaining natural appearance. It may be convenient to set all to a constant value Ω as above.

The proper selection of α (which is the strength of transform), spatial nonuniformity of the transform (the "window" of the transform) represented by Ω, the weighting function F(..) and basic functions $P_i(..)$ provides good quality image improvement, e.g. dynamic range compression.

The image is initially represented by electronic format (either in analogue or in digital form). The proposed algorithm works both with colour and with grayscale images. In case of colour images the proposed algorithm could modify either the intensity of image (whereas the hue and saturation are unchanged) or individual colour channels of an image (thus providing the colour correction). Different approaches to colour-correction of images are also suggested.

The procedure of the reversed transform is suggested. This procedure allows restoring of the original image from the transformed one.

A novel procedure for image compression is suggested. The procedure consists of an image transform, compressing the dynamic range of an image, as the first stage and a standard lossy image compression algorithm, such as JPEG or JPEG2000, as the second stage. After decompression and reversed ORMIT transform the quality of dark regions of an image is much better than the quality of such regions after JPEG compression-decompression (with the same size of compressed file). Thus the dynamic range of images, compressed by the suggested procedure, is increased.

Schematics, implementing different approaches to analogue hardware implementation of the image improvement system, are suggested. The first schematic is based on a polynomial approach, whereas the second is based on a piecewise linear mapping function approach. Also suggested is a simplified version of ORMIT, wherein the spatial nonuniformity parameter Ω is set to zero, which has a simpler implementation in analogue circuitry.

In this case, the ORMIT formula reduces to:

$$I' = \sum_{i=0}^{\infty} \langle P_i(I) \rangle \int_0^I P_i(\eta) d\eta,$$

where I(t) is the input (video) image signal, I'(t) is the output signal, and where $P_i(x)$ defines a basis of orthogonal functions and the operator ⟨..⟩ means the arithmetic mean (or mathematical expectation) value for the image. Versions are well suited to the enhancement of video images in real time.

A motivation for performing image enhancement in analogue circuitry immediately after capturing a video signal from an image sensor (e.g. CCD) is the fact that it provides potentially the widest dynamic range of the output image of the whole image processing system (e.g. the video capture system, image transmission or recording system and the video output system). It results in the visibility of details of an image which would otherwise have been below the level of noise caused by the transmission, recording and reproduction (in the case of analogue video cameras), or below the noise of digitizing by an analogue-digital converter (ADC) and lossy compression (like MPEG).

For real-time applications, the image of a subsequent video-frame is preferably processed on the basis of information from a previous frame, preferably the immediately preceding frame. This is justified because statistically video images change predominantly just slightly from frame to frame.

Preferably, the enhancer functions with an asynchronous regime, to allow the device to be easily installed both into digital and analogue cameras.

The correcting transform of the video signal, performed by the enhancer, is preferably smooth and therefore reduces the effect of amplification of visible noise, which is one of the drawbacks of standard histogram equalising technique (see William K. Pratt, "Digital Image Processing", John Wiley and Sons, 1978, pp. 307-318).

Advantages of an analogue device based on the proposed technique include smallness in size and significantly less power consumption in comparison with a digital implementation.

The use of analogue technology for nonlinear image processing allows maximizing of the dynamic range, since the nonlinear processing takes place before the digitizing.

The described analogue systems are capable of real-time video processing.

The suggested algorithm can be implemented as a monolithic analogue Integrated Circuit (IC); such a chip could be installed both into digital and into analogue video cameras. The size of an analogue IC implementing the histogram equalization could be relatively small and the power consumption relatively low in comparison with digital systems. Such an IC could be used e.g. in security cameras, where the cost and the power consumption could be critical. Other applications are in high-speed cameras, where digital image processing systems might not be fast enough, or in highest quality cameras, where the wide dynamic range of CCD (which could be higher than 2500:1) should be maximally preserved. In this case the use of the analogue equalizers could be justified, since it will allow avoiding the noise of digitizing, caused by the ADC.

BRIEF DESCRIPTION OF THE DRAWINGS

FIG. 3 shows examples of suitable orthonormal basis functions $P_i(x)$ together with their antiderivatives $Q_i(x)$; FIG. 3(a) shows the Legendre polynomial basis; FIG. 3(b) shows the piecewise basis.

FIG. 4 shows schematic illustrations of computational procedures for colour image enhancement.

FIG. 6(b) shows an analogue circuit to generate $Q_i(x)$, shown in FIG. 6(c), the antiderivatives of $P_i(x)$, shown in FIG. 6(a).

FIG. 18 shows a schematic illustration of a piecewise histogram equalizer. The system is capable of real-time processing of analogue video signals.

DETAILED DESCRIPTION OF THE INVENTION

Figure 1:
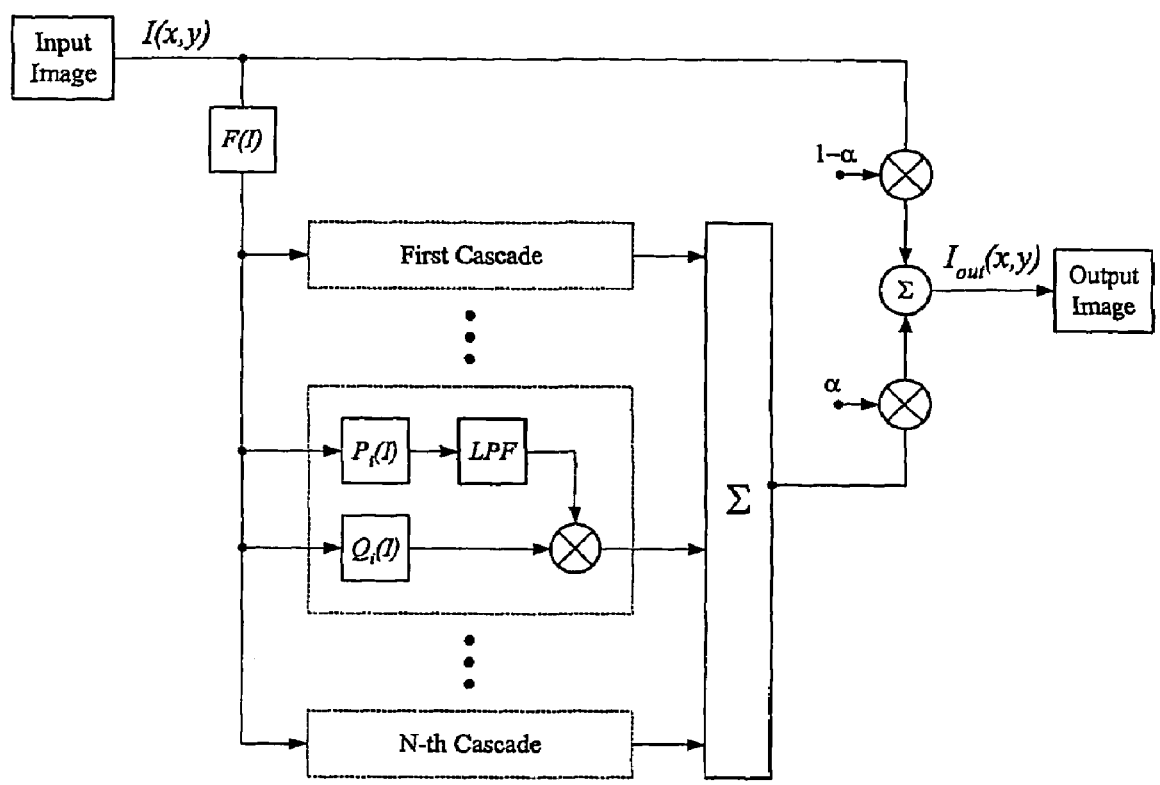
FIG. 1 is a schematic illustration showing a computational procedure used in the present invention.

In various embodiments of the invention, data processing apparatus implements a new image improvement transform, which is described by the following equation:

$$I_{out} = \Sigma_{i=0}^{N} \alpha_i(I) LPF_{\Omega_i}[P_i(F(I))] \cdot Q_i(F(I)) + \beta(I)$$

where $P_i(\gamma)$ is an orthogonal basis of functions of $\gamma$ defined at the range $0 < \gamma < 1$; and $Q_i(..)$ are antiderivatives of $P_i(..)$, i.e. $Q_i(F(I)) = \int_0^{F(I)} P_i(\eta) d\eta$, or some approximation thereto, $LPF_{\Omega}[..]$ is an operator of low-pass spatial filtering; $\Omega_i$ is a cut-off frequency of the low-pass filter, F(..) is a weighting function, $\beta(I)$ is preferably not equal to zero. $\Omega_i$ is preferably different for different i such that the transformation has a different degree of spatial nonuniformity in different brightness domains.

In one embodiment, the intensity value I(x,y) for each position (x,y) of a greyscale image is adjusted to generate an intensity value $I_{out}(x,y)$ (improved image) for each position in accordance with $$I_{out} = \alpha \Sigma_{i=0}^{N} LPF_{\Omega}[P_i(F(I))] \cdot \int_0^{F(I)} P_i(\eta) d\eta + (1-\alpha) I \qquad (0.1)$$

that is $I_{out} = \alpha \cdot \Sigma_{i=0}^{N} LPF_{\Omega}[P_i(F(I))] \cdot Q_i(F(I)) + (1-\alpha) I$, where $Q_i(F(I)) = \int_0^{F(I)} P_i(\eta) d\eta$ Here $\alpha$ is the "strength" of transform.

The element $\alpha$ represents the proportion of mixture of the fully equalised image (first term of the transform) with the initial image I. Thus the selection of appropriate strength of transform provides a compromise between the dynamic range compression and the natural look of an image. In many cases, the contrast in dark regions of an image can be increased without significant loss of the natural look of the overall transformed image. Whilst $\alpha$ may be a constant, it may vary in accordance with intensity as $\alpha(I)$.

The following expressions for $\alpha(r)$ and $\beta(I)$ are used in one example:

$$\alpha(I) = \frac{1}{2} - \frac{1}{2} \tanh\left(4 \frac{\log\left(\frac{I}{\Delta} + 1\right)}{\log\left(\frac{1}{\Delta} + 1\right)} - 2\right),$$

$$\beta(I) = I \cdot \left[\frac{1}{2} + \frac{1}{2} \tanh\left(4 \frac{\log\left(\frac{I}{\Delta} + 1\right)}{\log\left(\frac{1}{\Delta} + 1\right)} - 2\right)\right]; \text{ or}$$

$$\alpha(I) = A \left[\frac{1}{2} - \frac{1}{2} \tanh\left(4 \frac{\log\left(\frac{I}{\Delta} + 1\right)}{\log\left(\frac{1}{\Delta} + 1\right)} - 2\right)\right];$$

-continued $$\beta(I) = I \cdot \left( (1-A) \cdot \left[ \frac{1}{2} - \frac{1}{2}\tanh\left(4\frac{\log\left(\frac{I}{\Delta}+1\right)}{\log\left(\frac{1}{\Delta}+1\right)} - 2\right) \right] + \left[ \frac{1}{2} + \frac{1}{2}\tanh\left(4\frac{\log\left(\frac{I}{\Delta}+1\right)}{\log\left(\frac{1}{\Delta}+1\right)} - 2\right) \right] \right)$$

The functional forms of the strength functions $\alpha(I)$ and $\beta(I)$ are preferably chosen so that the transform is stronger (higher $\alpha$) in the darker parts of the image (low I) and becomes progressively weaker in brighter parts. This allows stronger enhancement of shadows without affecting the bright regions.

Figure 2:
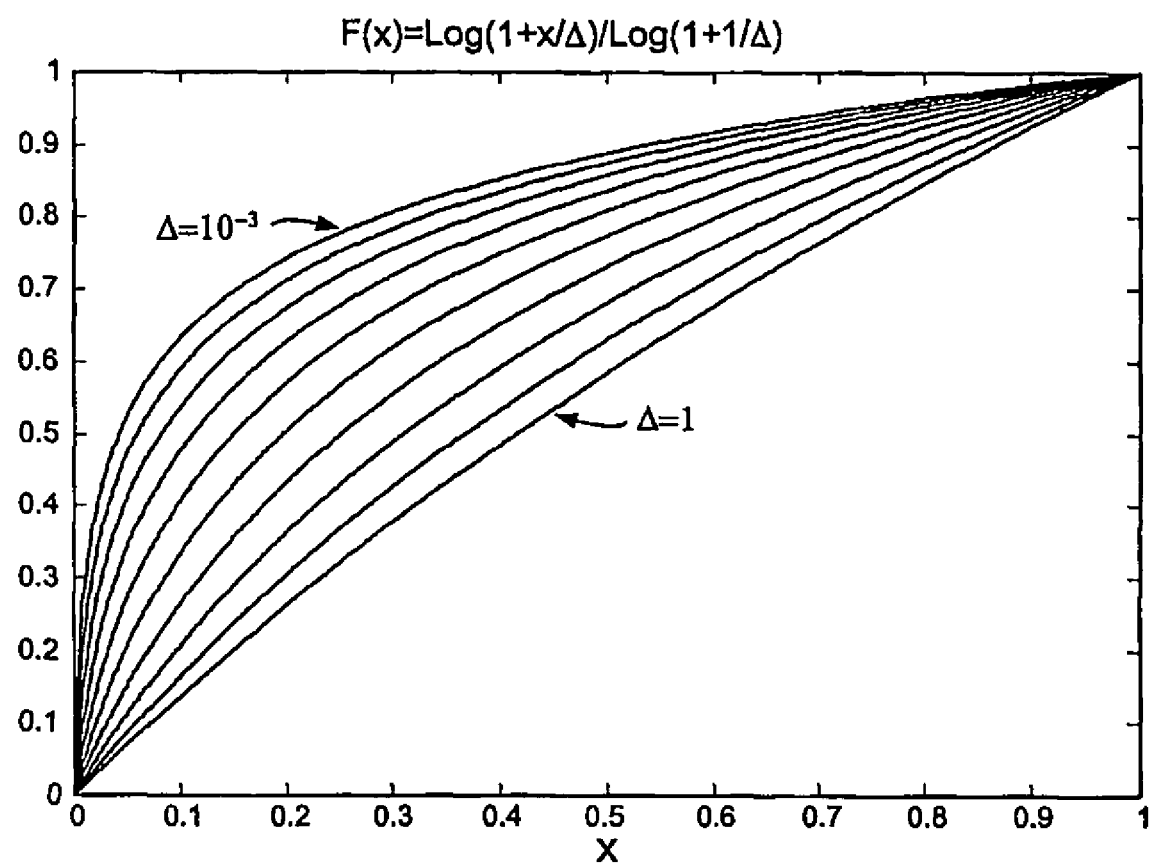
FIG. 2 shows examples of a weight function F(I), which represents the asymmetry in perception of dark (small I) and bright (large I) by the human eye. The smaller the parameter $\Delta$, the greater the degree of asymmetry.

The weighting function F(I) is used in the algorithm to take into account a property of the human eye approximated by a function which we will refer to herein as a logarithm transfer function:

$$F(I) = \frac{\log(I+\Delta) - \log(\Delta)}{\log(1+\Delta) - \log(\Delta)},\qquad(0.2)$$

where $0<I<1$, $\Delta$ is the parameter of "asymmetry" of "dark" and "light", which provides stronger adaptive capability to the dark part of the brightness domain of an image than to the bright one (thus the algorithm is more "active" in the dark regions of an image than in the bright ones). The dark part may be defined to include those regions which are at less than half the maximum intensity, preferably less than one quarter. To provide a degree of dynamic range compression, we select $\Delta<1$. Reducing $\Delta$ produces a stronger dynamic range compression. In practice, a preferred range is $0.001<\Delta<0.1$. FIG. 2 illustrates the logarithm transfer function for ranges in $\Delta$ from $\Delta=1$ to $\Delta=0.001$.

It should be noted that alternative functions, other than a logarithmic function, may also be used to approximate the properties of the human eye. By the appropriate selection of a (the strength of transform), spatial nonuniformity of the transform (the "window" of the transform) represented by $\Omega$, the weighting function F(..) and basic functions $P_i(..)$, it is possible to provide good quality image improvement, i.e. the dynamic range compression combined with the provision of "natural" looking transformed images.

FIG. 1 shows a schematic diagram of a computational procedure to evaluate equation (0.1) for each pixel of the input image given by coordinates (x,y). Here F(I) is the asymmetric weight function defined by equation (0.2); $P_i$ is the $i^{th}$ member of a basis of Legendre polynomials or piecewise functions (as described in the text); $Q_i$ is the antiderivative of $P_i$; LPF is a two-dimensional low-pass filter as described in the text. This could be coded in software directly by an experienced programmer, or implemented in analogue hardware using known elements. In the latter case, is a multiplier element, $\Sigma$ a summator; the nonlinear unit F(I) can be implemented using standard circuitry and the other elements are described elsewhere herein.

Different implementations of the ORMIT transform are suggested. A first is based on orthogonal polynomials: $P_i(\gamma)$. Legendre polynomials (see FIG. 3(a)) in particular are selected in one embodiment. A second implementation is based on the piecewise functions (see FIG. 3(b)). Computer software implementations may be produced in an image processing application; analogue hardware implementations of these implementations of the ORMIT transform are described below.

Analogue Hardware Implementations

Here we will consider possible analogue implementations of image improvement system, shown in the Figures.

Here x(t) refers to an image signal, and represents the intensity dependence during one frame of a video signal (0<t<T).

Figure 5:
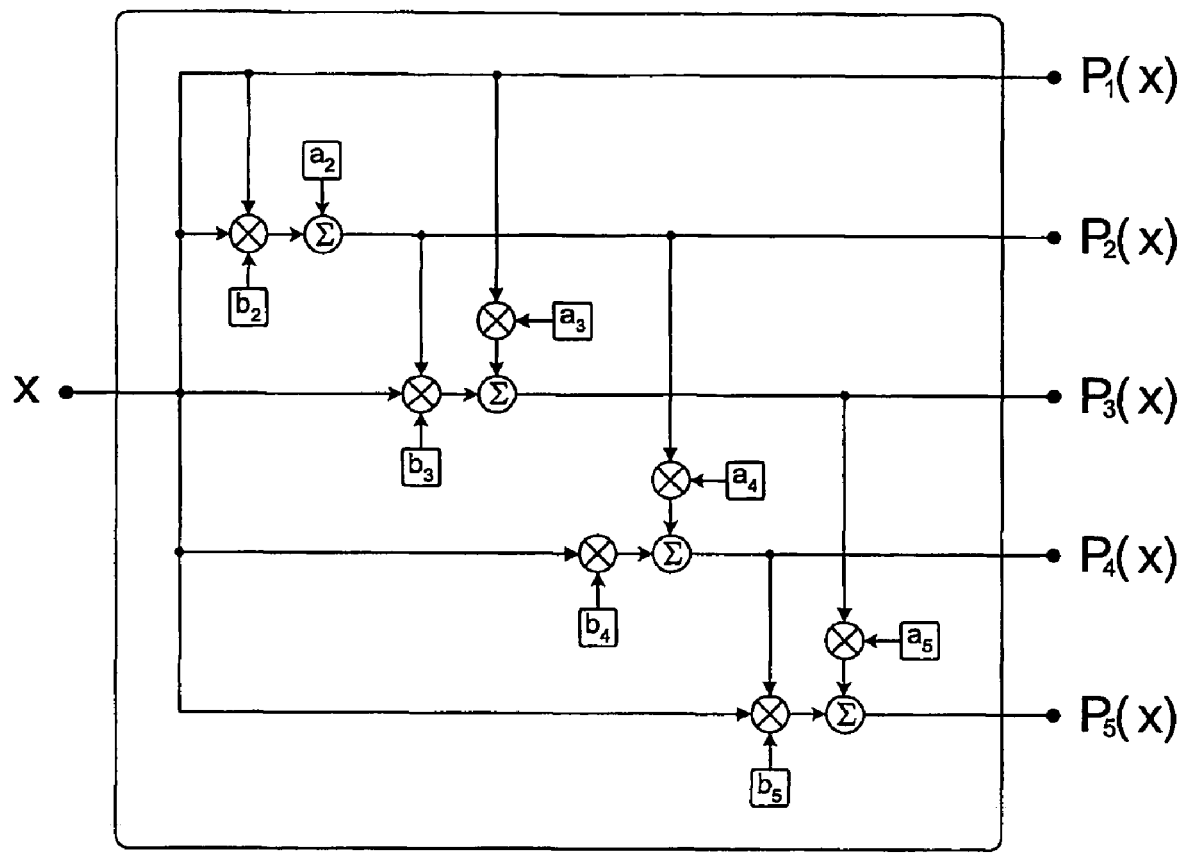
FIG. 5 is a schematic illustration of an analogue synthesiser of Legendre polynomials $P_i(x)$.
Figure 8:
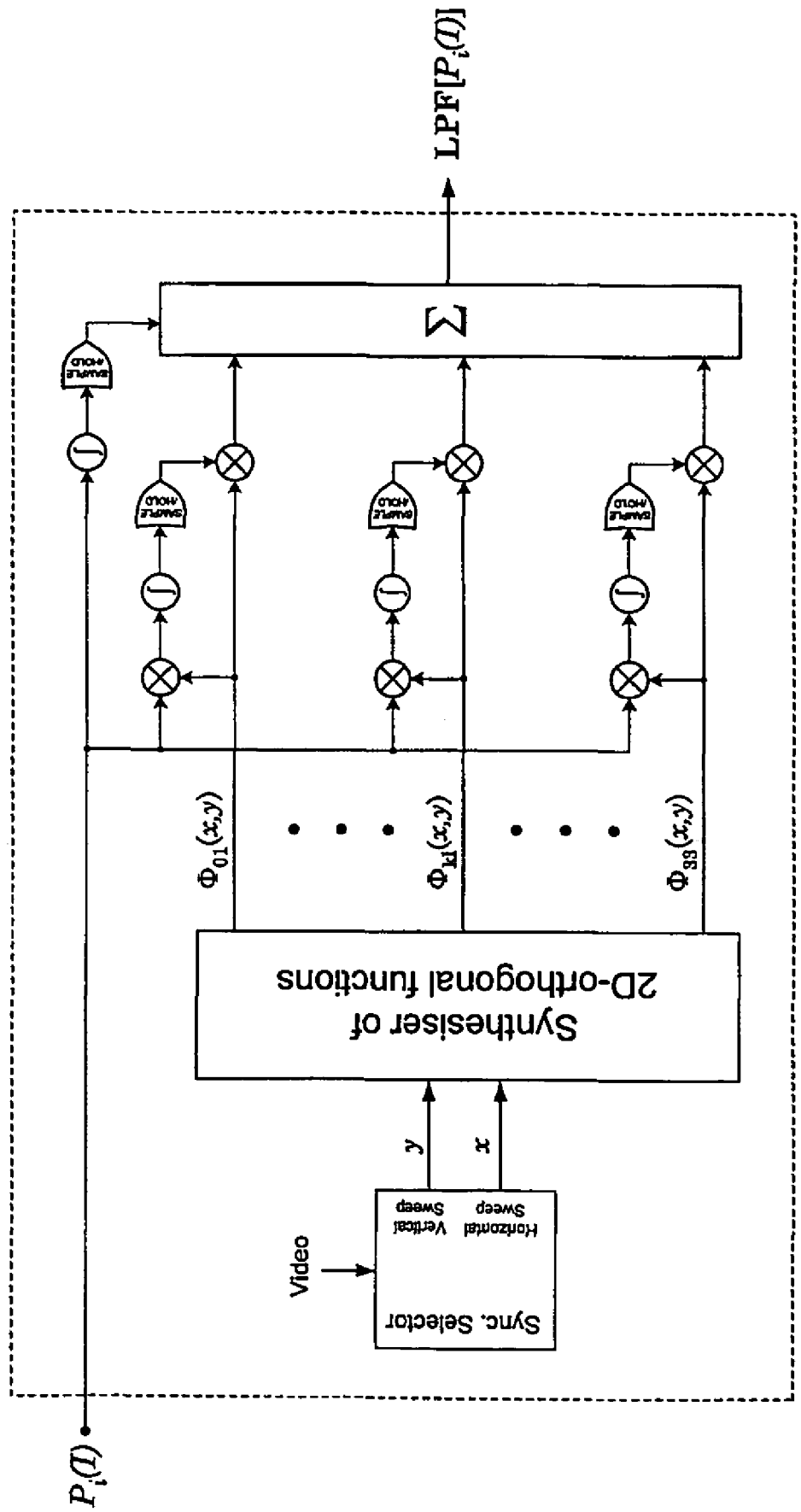
FIG. 8 is a schematic illustration of a 2D spatial low-pass filter.
Figure 9:
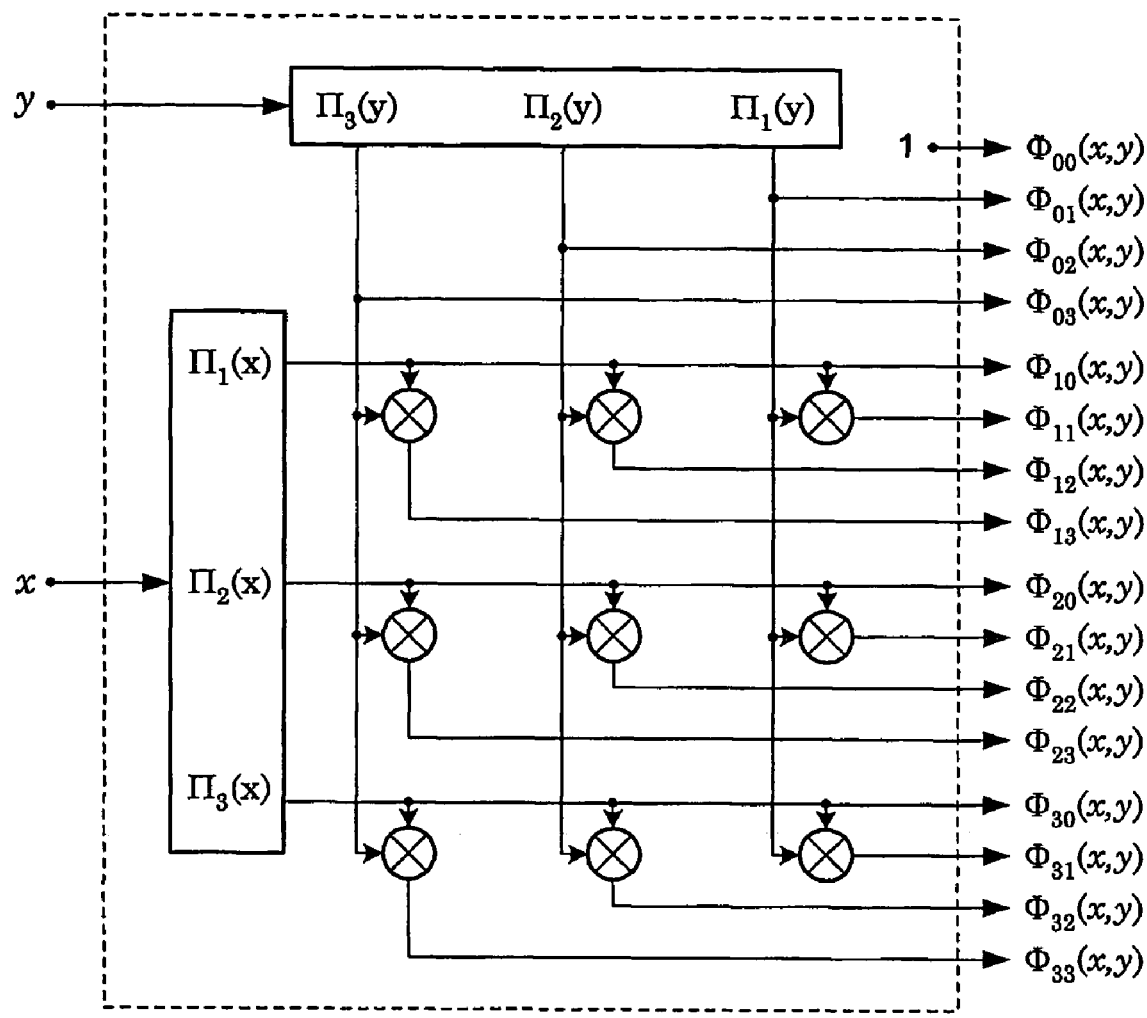
FIG. 9 is a schematic illustration of a synthesiser of 2D orthonormal functions.
Figure 10:
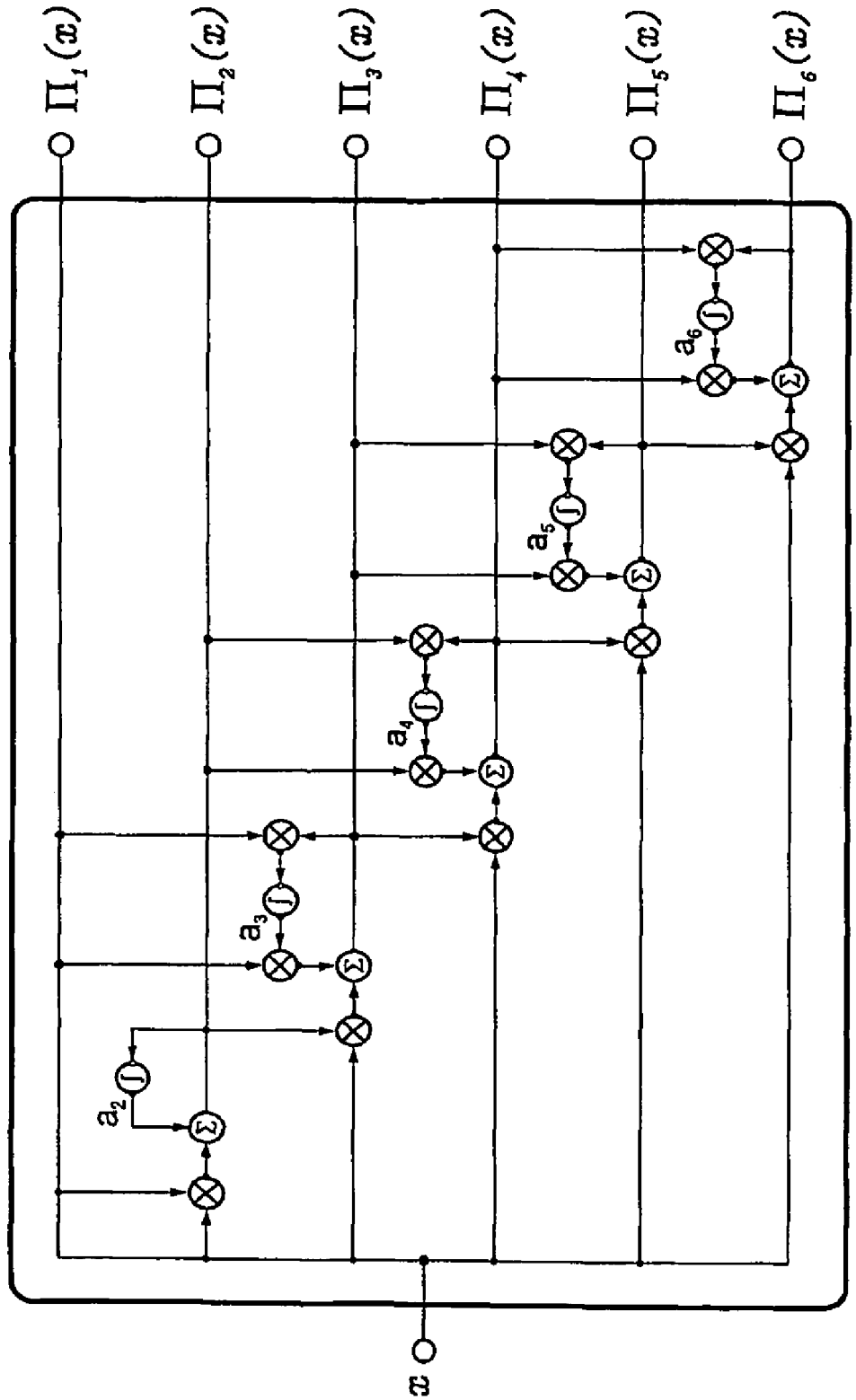
FIG. 10 is a schematic illustration of an analogue synthesiser of orthonormal 1D functions used in the synthesiser of FIG. 9.
Figure 11:
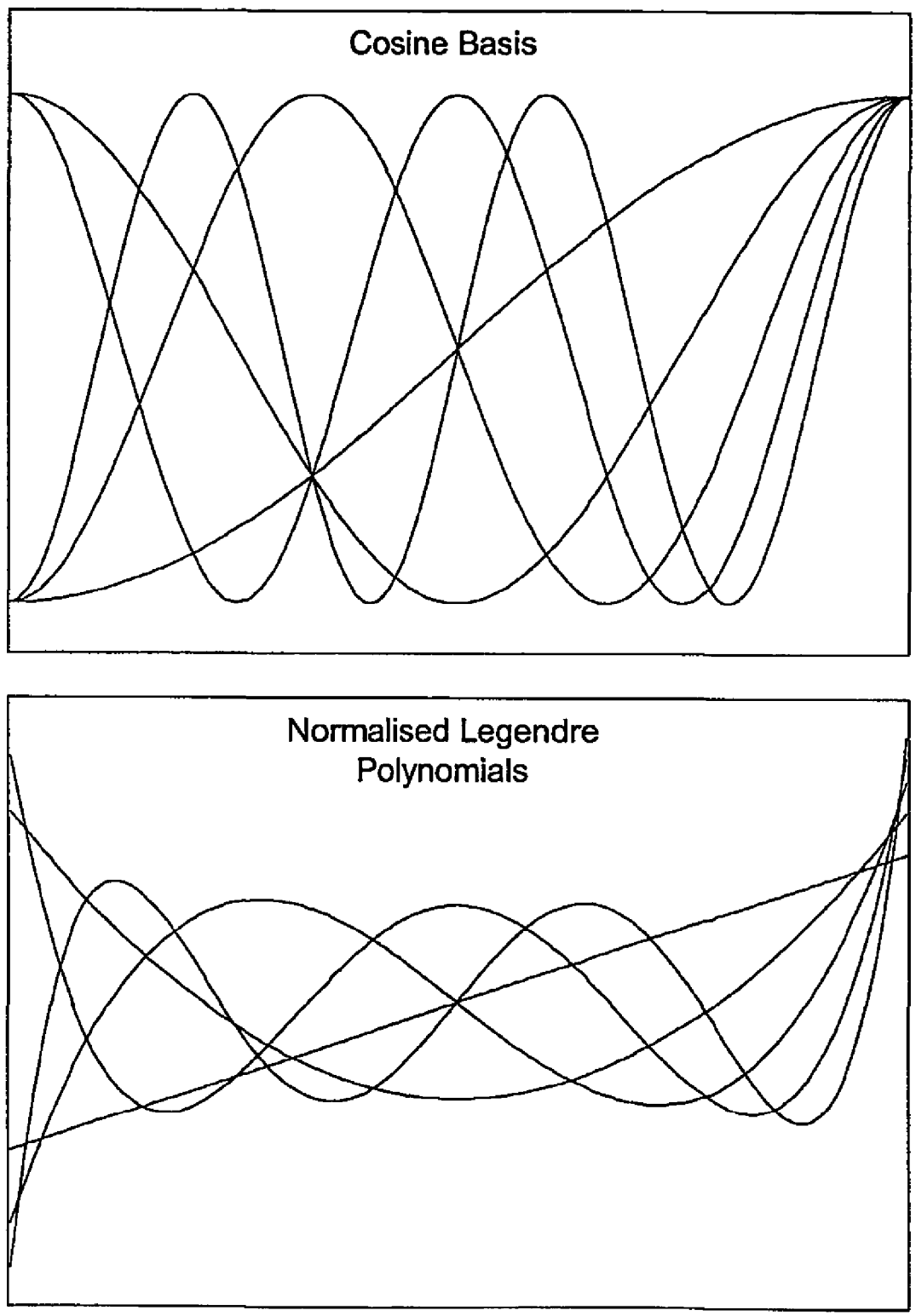
FIG. 11 shows Cosine basis functions and Legendre polynomials.

Both the "polynomial" and "piecewise" versions of analogue implementation of the ORMIT transform may be based on an analogue implementation of the low-pass filter, such as that shown in FIG. 8. FIG. 8 shows a schematic diagram of the 2D spatial low-pass filter (LPF) employing analogue circuitry. It takes as input the signal $P_i(I)$, which could be a member of a Legendre or a piecewise basis. In the diagram, $\int$ is an integrator element, SAMPLE/HOLD is a standard sample/hold amplifier and the synthesiser may be arranged as shown in FIG. 9. This filter employs the 2D basis of orthonormal functions $\Pi_{ij}(x,y)$. 2D orthonormal functions $\Pi_{ij}(x,y)$ could be generated on the basis of 1D orthogonal functions $\Pi_i(x)$ and $\Pi_j(y)$ (see FIG. 9). In FIG. 9, 1D Legendre polynomial or cosine functions (FIG. 11) $\Pi_i$ are generated from input signals x,y. These are combined into their 2D counterparts $\Phi_{ij}(x,y)$ which are used in the LPF generator shown in FIG. 8. Synthesisers of 1D orthogonal functions $\Pi_i(x)$ (adaptive and with fixed coefficients) are shown in FIG. 5 and FIG. 10. The adaptive synthesiser of orthogonal functions could generate:

1. Legendre polynomials if x(t) is the sawtooth waveform signal, that is, the signal x(t)=SAW(t)=2REM(t/T)−1, where REM(..) is the remainder after division, t is the time, T is the period of the sawtooth signal (more information about the analogue synthesiser of orthogonal functions can be found in [1]);

2. Cosine basis of functions if x(t)=sin ($\pi$SAW(t)).

A "fixed" synthesiser of Legendre polynomials can be based on the following recurrence relations (see K. B. Datta and B. M. "Orthogonal Functions in Systems and Control", Advanced Series in Electrical and Computer Engineering, Mohan publisher, World Scientific Pub Co, 1995):

$$P(x)=1,\ P_1(x)=x,\ P_i(x)=a_iP_{i-2}(x)+b_ixP_{i-1}(x),\qquad(0.3)$$

where $$a_i = \frac{i-1}{i} \text{ and } b_i = \frac{2i-1}{i}.$$

The scheme of such a synthesizer is shown in FIG. 5. The first five coefficients $a_i$ and $b_i$ are shown in the Table 1 below.

TABLE 1

| i | 1 | 2 | 3 | 4 | 5 |
|---|---|---|---|---|---|
| $a_i$ | 0 | $-\frac{1}{2}$ | $-\frac{2}{3}$ | $-\frac{3}{4}$ | $-\frac{4}{5}$ |
| $b_i$ | 1 | $\frac{3}{2}$ | $\frac{5}{3}$ | $\frac{7}{4}$ | $\frac{9}{5}$ |

The same recurrence relations (0.3) are valid for the Cosine basis of functions. In this case the coefficients $a_i=-1$, $b_i=2$ for any i.

The Cosine basis could be used as an alternative to the Legendre polynomials in the analogue low-pass filter. Both could be synthesised efficiently in an analogue circuit using methods described in the text. The cosine basis has the advantage that the transform is more spatially uniform (free of "edge effects").

Polynomial Version of the ORMIT Transform

Figure 6:
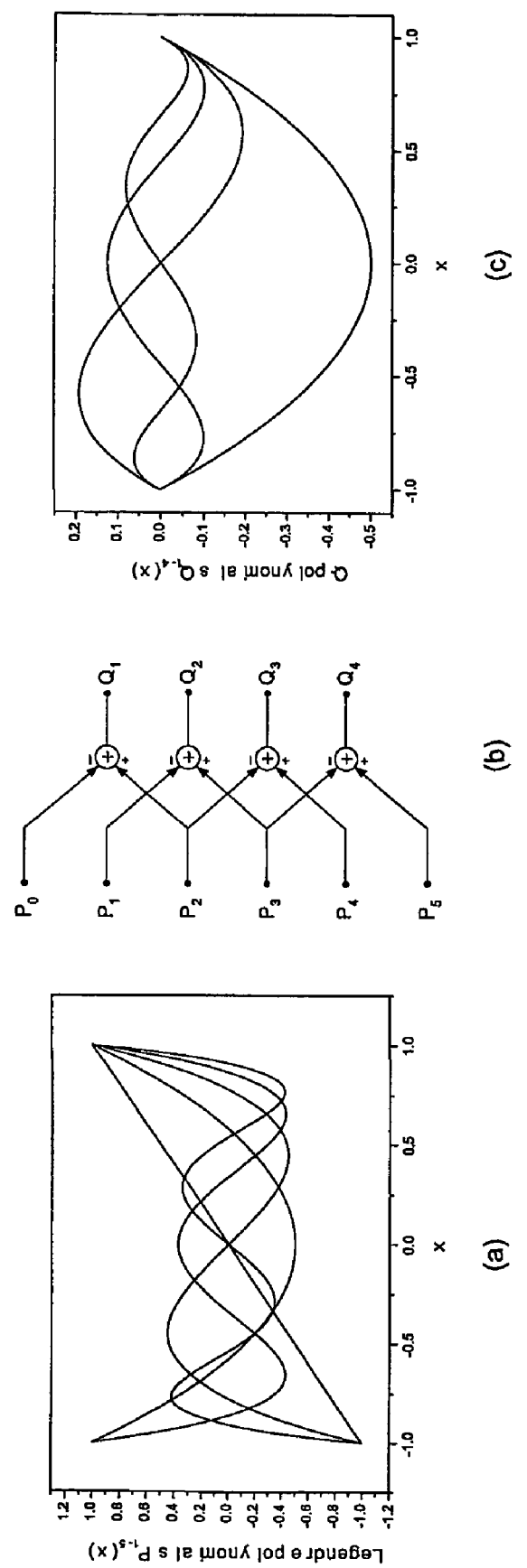
FIG. 6 shows schematically the generation of functions using an analogue circuit.
Figure 13:
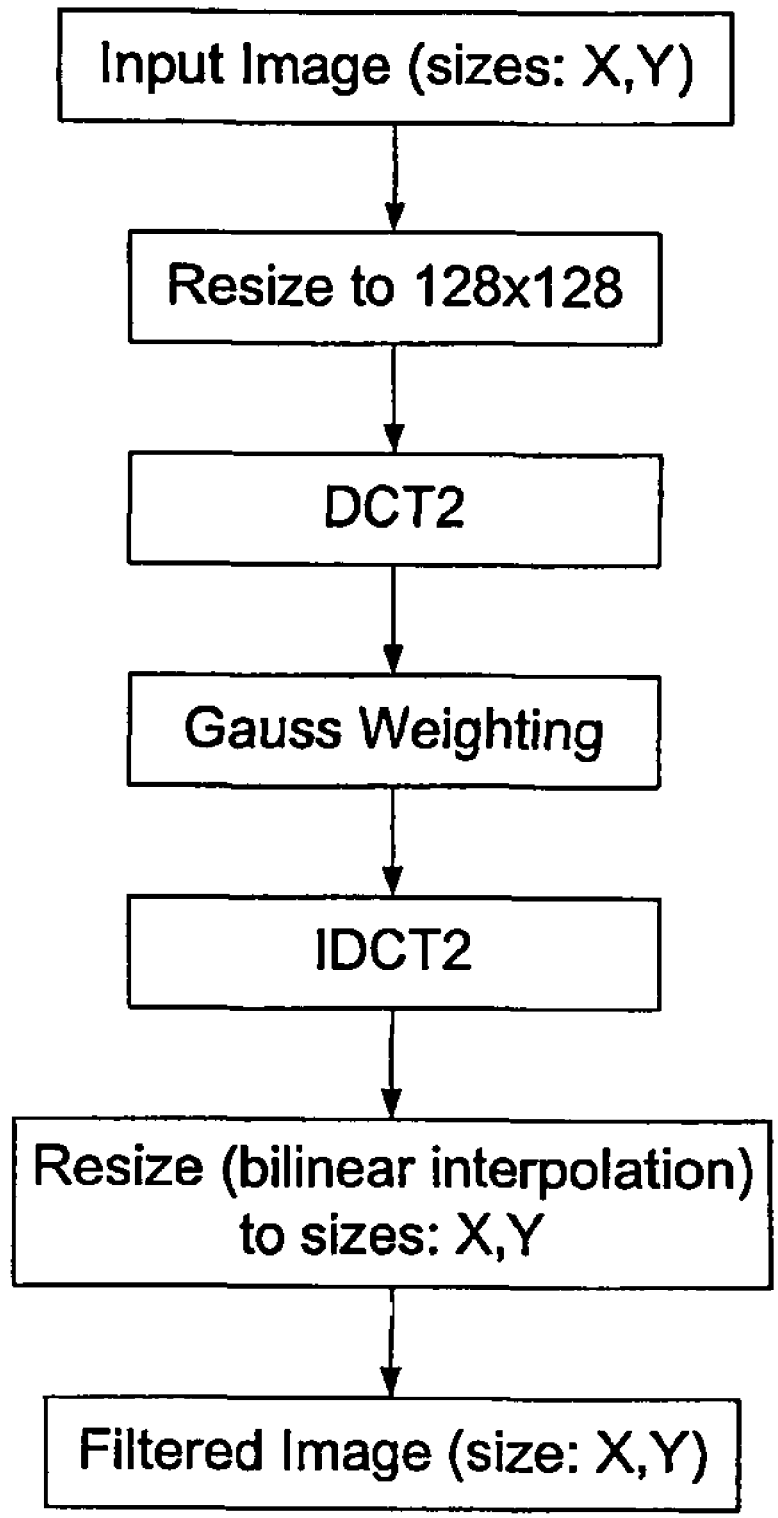
FIG. 13 is a schematic block diagram of a fast software implementation of the low-pass filter.

This version of the ORMIT transform employs Legendre polynomials not only for low-pass filtering, but also as the basic functions $P_i(x)$ that used for computation of the transfer function of the ORMIT (see FIG. 1 and FIG. 3(a)). Other basic functions that used for construction of the ORMIT's transfer function are $Q_i(x)$. The synthesizer of the $Q_i(x)$ polynomials is shown in FIG. 6. Here, $\oplus$ is a differential amplifier. Another version employs the Legendre polynomials for the basic functions $P_i(x)$ used in the transfer function of ORMIT, and the cosine functions for the low-pass filtering. A block-scheme of a fast software implementation of the low-pass filter is shown in FIG. 13. The algorithm includes 1) image resizing, 2) a 2D Discrete Cosine Transform (DCT2), 3) an apodisation (Gauss) function, which zeroes the high order spectral components of the resized image, 4) an inverse DCT (IDCT2), which gives a smooth approximation of the resized image, 5) the bilinear interpolation procedure, which gives a smooth approximation of the input image (sizes: X,Y), that is the output of the low-pass filter.

Mixed Polynomial-Piecewise Version of the ORMIT Transform

Figure 7:
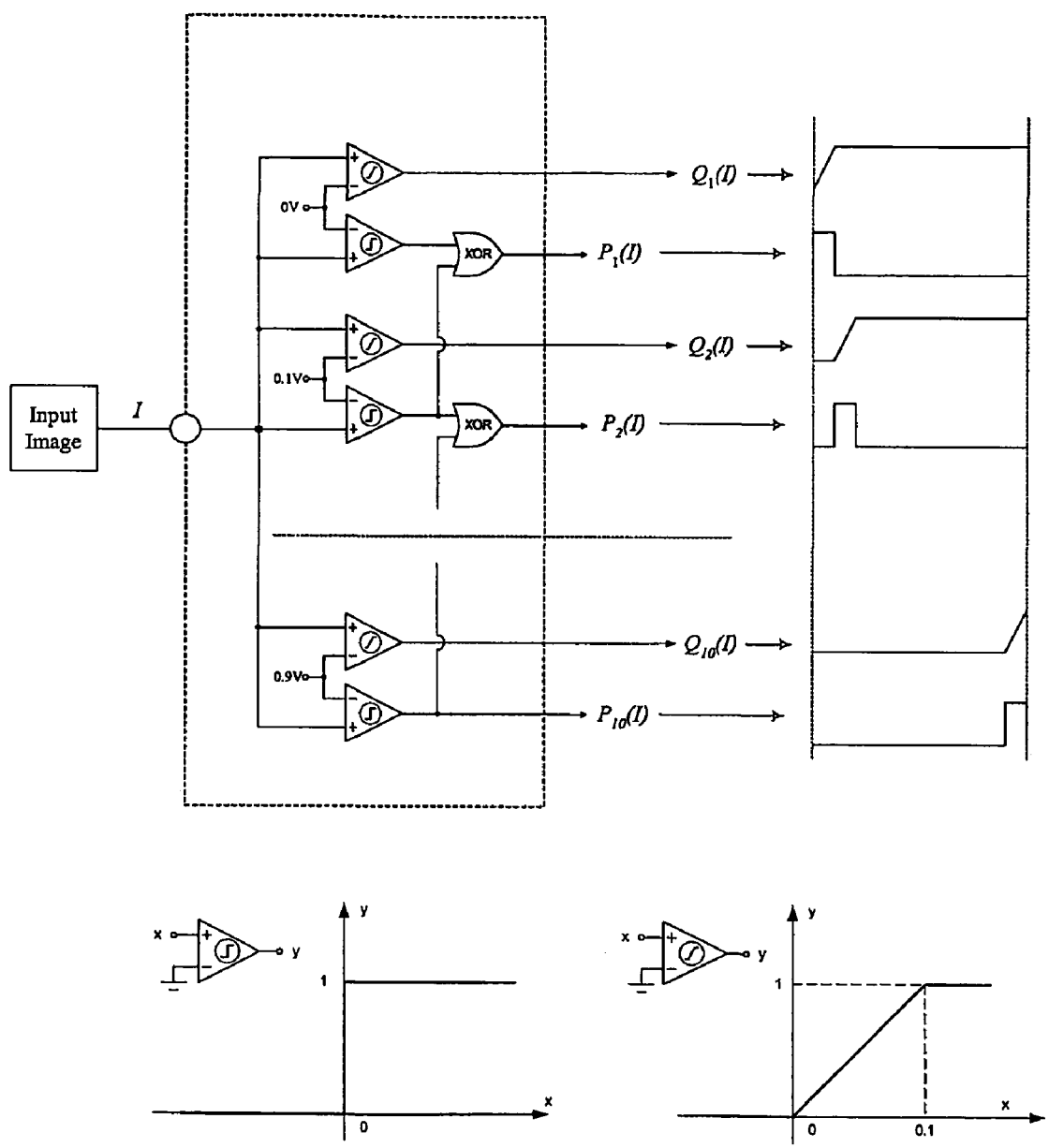
FIG. 7 is a schematic illustration of a synthesiser of functions used in a piecewise transfer function version of an analogue hardware implementation of an image processor.

This version of the ORMIT transform employs the basic functions $P_i(x)$ and $Q_i(x)$ shown in FIG. 3(b). A synthesiser producing these functions is shown in FIG. 7. The functions produced by different elements are illustrated on the right hand side of FIG. 7. In FIG. 7, the functions are non-overlapping, but alternatively two subsets of mutually orthogonal, overlapping functions may also be used. In FIG. 7, the lower portions illustrate the signals output by the amplifier elements used in the arrangement illustrated in the main part of the Figure. The low-pass filter may either employ Legendre polynomial functions or cosine functions, as described above.

Further Details of Analogue Inplementations

To illustrate how an actual analogue hardware implementation would be constructed in the Legendre polynomial case, consider the following.

The coefficients $a_i$ and $b_i$ could be stored into laser-trimmed resistors at the stage of manufacturing of an analogue Application Specific Integrated Circuit (ASIC). It should be noted here that the adaptive system of the adjustment of the $a_i$ coefficients, which was proposed in V. Chesnokov, "Analog Synthesizer of Orthogonal Signals", IEEE Transactions on Circuits and Systems—II: Analog and Digital Signal Processing, 47 (2000), No. 2, pp. 125-132 (and which is illustrated in FIG. 5), could be used in the manufacture of an analogue ASIC containing the synthesizer of Legendre polynomials. This could be directly implemented as an analogue circuit using multipliers, summators and, for example, trimmed resistors to supply the parameters $a_i$, $b_i$.

Let us consider now the procedure of the Q-polynomials synthesis. The Legendre polynomials, defined by the recurrence relations (0.3), satisfy the following relations (see K. B. Datta and B. M. "Orthogonal Functions in Systems and Control", Advanced Series in Electrical and Computer Engineering, Mohan Publisher, World Scientific Pub Co, 1995):

$$\overset{0}{P}_{i+1}(x) - \overset{0}{P}_{i-1}(x) = (2i+1) \cdot P_i(x). \qquad (0.4)$$

Integrating Equation (0.4) in the range (−1, x) and taking into consideration the property of the Legendre polynomials (see Eq.(0.3)): $P_i(1)=i$ and $P_i(-1)=(-1)^i$ for any i (see FIG. 6a), gives:

$$Q_i(x) = \frac{1}{2i+1}(P_{i+1}(x) - P_{i-1}(x)) \qquad (0.5)$$

Here we have defined Q-polynomials as: $Q_i(x) = \int_{-1}^{x} P_i(x) dx$. The procedure of the Q-polynomials synthesis is illustrated in FIG. 6. It should be noted here that the Legendre polynomials defined by the recurrence relations (0.3) are not normalized. The normalized and non-normalized Legendre polynomials respectively are shown in the FIG. 3(a) (where the normalized Legendre polynomials and corresponding Q-polynomials are shown) and FIG. 6(a). Therefore to implement the scheme, shown in FIG. 17, the apparatus should perform the normalization of the signals generated by synthesizers of the Legendre polynomials and Q-polynomials shown in the arrangement of FIG. 6. These normalising coefficients could be realized by the constants of integration of integrators shown in FIG. 17, so that different integrators should have different constants of integration $\mu_i$ i.e.

$$F_i = \mu_i \int_0^\tau f_i(t) dt.$$

Figure 19:
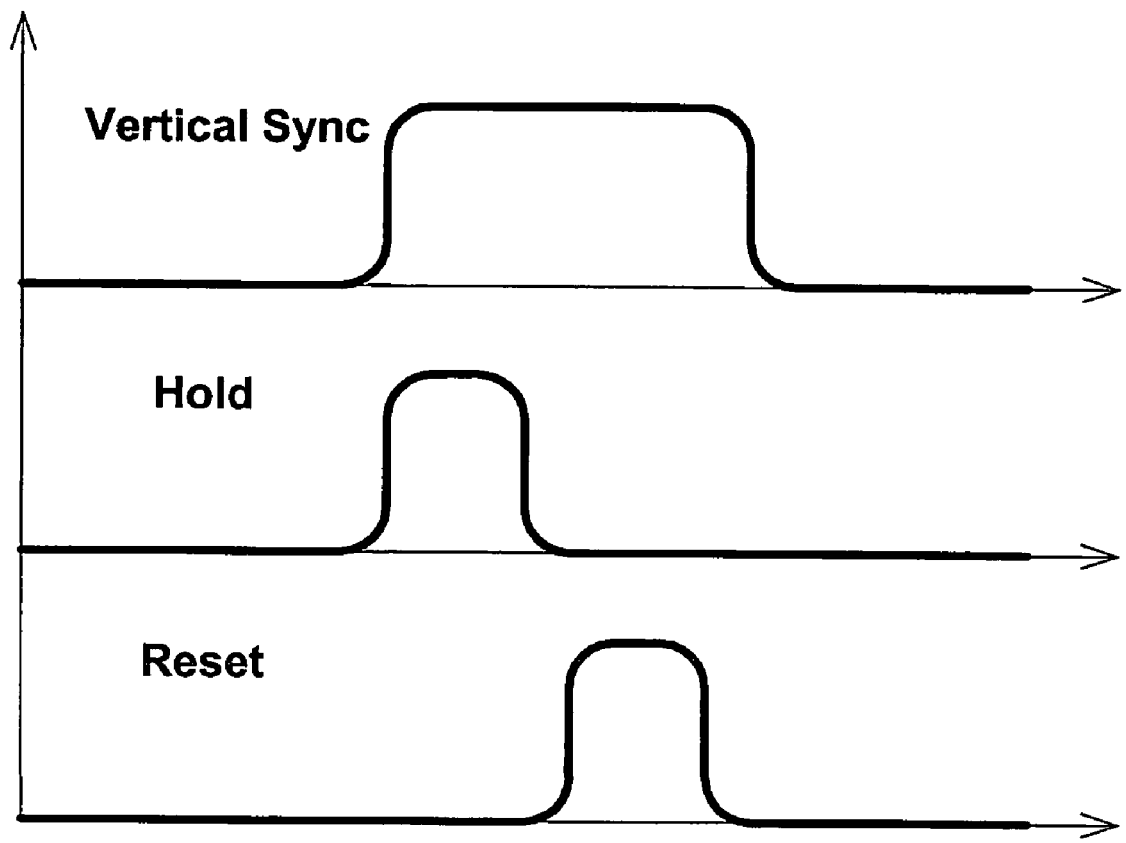
FIG. 19 shows examples of "Hold" and "Reset" signals generated by the Sync-selector, shown in FIG. 18.

The task of the sync-selector is the extraction of the vertical sync pulses. The "hold" signal should be generated at the beginning of the vertical sync pulse, whereas the "reset" pulse should be generated just after the "hold" pulse and before the start of the next frame (see FIG. 19). This scheme (as well as the polynomial histogram equaliser) equalises the subsequent frame on the basis of information taken from the previous frame.

Figure 17:
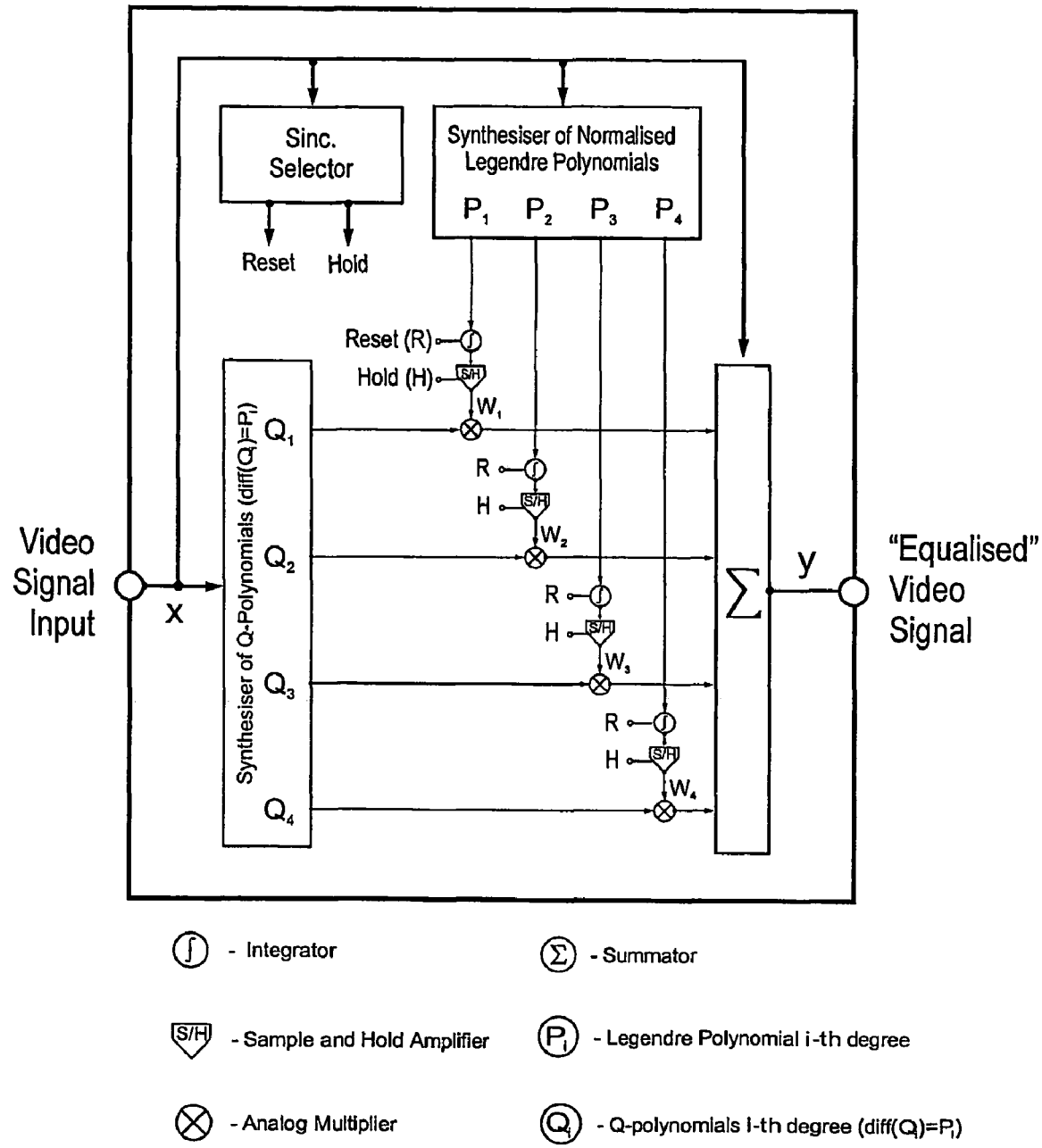
FIG. 17 shows a schematic illustration of a polynomial histogram equalizer. The system is capable of real-time processing of analogue video signals.

We also suggest a simplified implementation wherein the non-uniformity parameters of the ORMIT transform, the $\Omega_i$, are all set to zero. The corresponding circuitry in different embodiments is illustrated in FIGS. 17 and 18. Note that, in FIG. 18, the lower portions illustrate the signals output by the amplifier elements used in the arrangement illustrated in the main part of the Figure. The circuitry is simplified because it does not require the presence of a low-pass filter. Although the improvement of images is not as effective as the full ORMIT transform, in many cases it may be sufficient to give a good enhancement of the image stream.

In one embodiment, an aim is to provide histogram equalization of a continuous (both in time and in magnitude) video signal, which is spatially uniform. Legendre polynomials are used as a basis of orthogonal functions (although it is possible to use other orthogonal functions) since they could be implemented in analogue hardware (see FIG. 5), which allows the purely analogue implementation of a histogram equalizer.

The general result is:

$$y = \sum_{i=0}^{\infty} \langle P_i(x) \rangle \int_0^x P_i(x)dx, \quad (0.6)$$

where y is the intensity of the output signal, and the operator $\langle .. \rangle$ is the arithmetic mean (or mathematical expectation) value for the whole picture. In case of video-signal x(t) the arithmetic mean is $$\langle P_i(x) \rangle = \frac{1}{T} \int_0^T P_i(x)dt.$$

If we denote the antiderivative of $P_i(x)$ as $Q_i(x)$: $Q_i(x) \equiv \int_0^x P_i(x)dx$ we have:

$$y = \sum_{i=0}^{\infty} \langle P_i(x) \rangle Q_i(x).$$

If $N \rightarrow \infty$ the output video signal's y(t) brightness histogram will be uniform. In practice however N should be restricted, first: to provide the low computation intensity of the procedure, and second: to provide smooth histogram equalization. Computer modeling has showed that pictures may be considerably improved even at N as small as 3. It should be noted here that there is a probability of situations when the transfer function y(x), which is approximating the cumulative histogram H(x), is not a monotonically increasing function. This gives an impression of an unnatural image and in most cases should be avoided. This could be achieved by introducing a coefficient of strength of the transform—$\alpha$.

$I_{out} = \alpha I' + (1-\alpha)I$, where $0 < \alpha < 1$.

In effect, the output image is a mixture of the input image x and the equalized one y. Decreasing of $\alpha$ permits avoidance of the negativity of the derivative of the transfer function $$\frac{\partial x_{out}}{\partial x} < 0.$$

Normally it is sufficient to decrease $\alpha$ down to 0.5. The "strength" of transform coefficient $\alpha$ can be adjusted manually by user of a video camera (to get an appropriate image) or automatically by an adaptive procedure, which can be performed e.g. during the time between frames.

A straight implementation of the above-described algorithm assumes that for each frame the integrals $$\int_0^T P_i(2x(t)-1)dt$$

should be calculated to establish the transfer function for modification of the current frame. This makes a straight analogue implementation difficult unless the analogue signal's delay line, "remembering" the whole frame is used. Nevertheless, the fact that the frames statistically are just slightly changing from frame to frame, gives the opportunity of real-time analogue implementation of this algorithm. In this case the statistical information from a previous frame (represented by the above mentioned integrals) is used for modification of subsequent frame. On the scheme of the equalizer, which will be described in subsequent sections, (see FIG. 17) the integration and subsequent placement of the result into a sample-hold amplifier are implementing this procedure.

An important additional particular case is a basis of square functions $P_i(x)$, as are shown in the FIG. 3(b). Such basic functions are also suitable for analogue implementation of the histogram equaliser.

One of the typical disadvantages of the standard histogram equalization technique is that it increases the visible noise of pictures (see e.g. William K. Pratt, "Digital Image Processing", John Wiley and Sons, 1978, pp. 307-318) as well as makes images look unnatural. The noise (which is the noise of digitizing plus the noise of CCD itself) amplification as a result of a nonlinear image transform is a well known phenomenon. The reason is that the cumulative histogram (therefore—the transfer function) of typical images could have very large derivative (which means nonuniformity of histogram).

Unlike the transfer function of standard histogram equalization, the transfer function of the proposed device polynomial histogram equalizer) is very smooth, since it is composed from the low order polynomials (e.g. $3^{rd}$ order). It results in the fact that the processed images appear less noisy and more natural in comparison with ones processed with a standard histogram equalization procedure.

The proposed device has the ability to improve a high percentage of images whereas the probability of worsening of images is very small.

In fact, such a property, as the ability of improvement of any kind of picture is not absolutely necessary (although desirable) for image enhancement systems installed into video camera, since any effect (and in particular the suggested-smooth histogram equalization algorithm) can have an adjustable strength (or can be switched off by the user).

Software Implementations

It should be noted that the processing of digital video images via a software implementation of ORMIT is performed in essentially the same manner as described herein in relation to analogue hardware implementations, using functional software modules in place of the circuitry described above and illustrated in the accompanying Figures.

Handling of Colour Images

Different schemes could be used for the processing of colour images. The simplest case is shown in FIG. 4(a). The element "ORMIT" performs the image enhancement procedure. For any given pixel, R (R') is the input (output) intensity in the red channel, and analogously for other colours. I (I') is the overall input (output) intensity, or equivalently brightness. denotes multiplication, $\Sigma$ denotes summation. The W parameters are standard weighting factors. In the first case at the first stage the intensity signal I is produced for each pixel of an image in accordance with formula $I=W_R R + W_G G + W_B B$ (or alternatively the corresponding root mean square sum), where R, G and B are values of red, green and blue.

The next stage is the ORMIT transform of the intensity signal, which results in the improved intensity signal $I_{out}$. The final stage is the modification of each colour channel in accordance with the same proportion as the modification of the intensity:

$$R' = \frac{I_{out}}{I}R, \; G' = \frac{I_{out}}{I}G \text{ and } B' = \frac{I_{out}}{I}B.$$

Such a scheme improves the intensity distribution of an image without modification of the hue and saturation.

Another scheme, employing the ORMIT is shown in FIG. 4(b). Such a scheme provides the spatial equalisation of different colour channels, so that not only the whole image has balanced colours, but also any region of an image (with the sizes larger than the size of "window"

$$l_\Omega = \frac{1}{\Omega},$$

where $\Omega$ is the cut-off frequency of the low-pass filter used in the ORMIT transform) is colour-balanced. A wide range of colour correction procedures may employ the ORAM transform.

Reversibility of the ORMIT Transform

Since the ORMIT transform is a smooth transform, it could be described by a small number of parameters (typically the whole set of parameters is less than 1 kB, and preferably less than 100 bytes).

In many cases and in particular in the case of the piecewise version of the ORMIT transform, it is possible to restore the initial image on the basis of the parameters of the transform and the ORMIT-transformed image.

Let us consider the piecewise version of the ORMIT transform:

$$I_{out} = \alpha \cdot \Sigma_{i=0}^N LPF_\Omega[P_i(F(I))] \cdot Q_i(F(I)) + (1-\alpha)I,$$

where $P_i(..)$ and $Q_i(..)$ are shown in FIG. 3(b). The parameters describing the ORMIT transform are:

1. $\Delta$, which defines the selected $F(I)$,
2. $\Omega$, the "parameter of nonuniformity", which for the present embodiment will be set as a constant for all i, and
3. the amplitudes of spectral components $C_{kl}^{(i)}$ for different basic functions $P_i(I(x,y))$, which are calculated during the low-pass filtering and are the result of the 2D Cosine Transform and subsequent Gauss-weighting function:

$$C_{kl}^{(i)} = DCT2(P_1(F(I)))\{k, l\} \cdot \exp\left(-\left(\frac{k^2}{X^2} + \frac{l^2}{Y^2}\right)\Omega^2 \cdot \min(X^2, Y^2)\right)$$

(see FIG. 13), where X and Y are the dimensions of an image, $\Omega$ is the parameter of the spatial nonuniformity, which is the relation of the "window" size $I_\Omega$ (in any region of image with larger sizes than $1_\Omega$ the histogram related to this region will be equalised) to the smallest of the dimensions of the image. The parameter of nonuniformity could be $0<\Omega<10$, but in most cases is less than 3. Since the Gauss function is decreasing very quickly with increasing k or 1, only a few parameters $C_{kl}^{(i)}$ (with $0 \leq k,l<3 \div 10$) will have nonzero values and thus will be required to define the transform.

The piecewise ORMIT transformation therefore can be represented as $$I_{out} = \alpha \cdot \Sigma_{i=0}^N IDCT2[C_{kl}^{(i)}] \cdot Q_i(F(I)) + (1-\alpha)I,$$

or $$I_{out} = \alpha \cdot \Sigma_{i=0}^N W_i(x,y) \cdot Q_i(F(I)) + (1-\alpha)I, \text{ where } W_i(x,y)$$
$$= IDCT2[C_{kl}^{(i)}].$$

Figure 14:
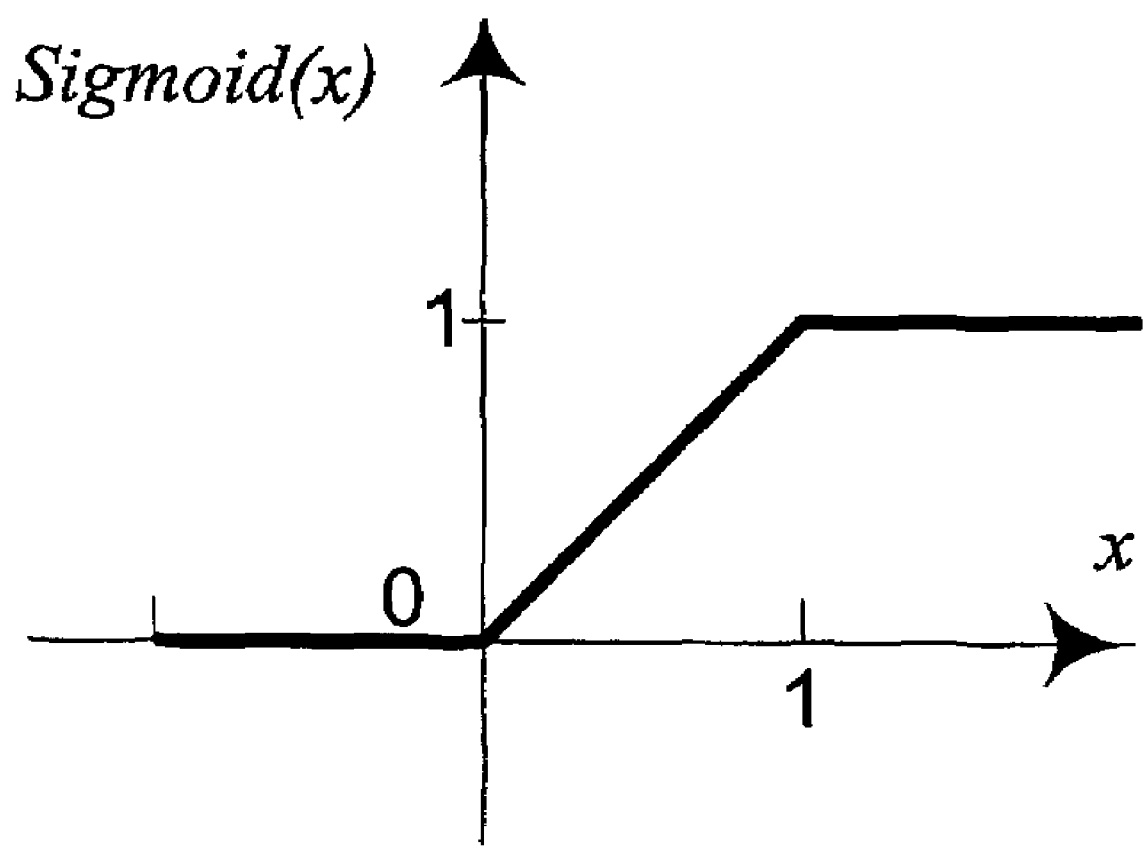
FIG. 14 illustrates the Sigmoid function.

The reversed transform for the piecewise version of the ORMIT is defined by the following equations:

$$F(I) = \sum_{i=1}^N Sigmoid\left(\frac{I_{out} - I_i}{\alpha W_i + \frac{1-\alpha}{N}}\right),$$

where the Sigmoid(x) function is shown in FIG. 14; $I_i=0$; $I_i$ are defined by $$I_{i+1} = \sum_i^i \alpha \cdot W_i + i\frac{1-\alpha}{N};$$

Since the function F(I) is monotonically increasing, we can get the inverse expression I(F) taking into account the definition of F(I) (0.2). For the reversed piecewise ORMIT transform we thus have:

$$I = \exp(F \cdot (\log(1+\Delta) - \log(\Delta)) + \log(\Delta)) - \Delta.$$

The polynomial implementation of the reversible ORMIT transform (as well as the most of other possible implementations with other basic functions) has no exact (analytical) representation, but a fast approximating implementation of the reversed transform for polynomial version of the ORMIT transform can also be produced.

An Enhancement of Lossy Compression Algorithms

This section describes the combination of a dynamic range compression algorithm, such as (but not limited to) the ORMIT transform, with a lossy compression algorithm such as JPEG.

Lossy compression of images is widely used. This is because the storage size of the compressed image can be as much as 10 to 100 times smaller than the size of the original image, whereas the compressed and original images are virtually indistinguishable in appearance.

However, images which have undergone lossy compression are not suitable for post-processing, such as is used for the analysis of medical images (X-rays, MRI etc) and in the manipulation of photographic images on computer. Post-processing of this kind amplifies the noise in the compressed picture, resulting in unacceptable artifacts in the processed image. For this reason, lossless formats (e.g. TIFF, BMP, PNG, lossless JPEG) are used. But these have the disadvantage that they result in large file sizes, which are costly to transmit and store.

A new method is here presented, which combines dynamic range compression with standard lossy image compression to produce an image which is approximately the same file size as a standard lossy format, but which retains the important information required for high-quality post-processing.

Figures 15A, 15B, 15C:
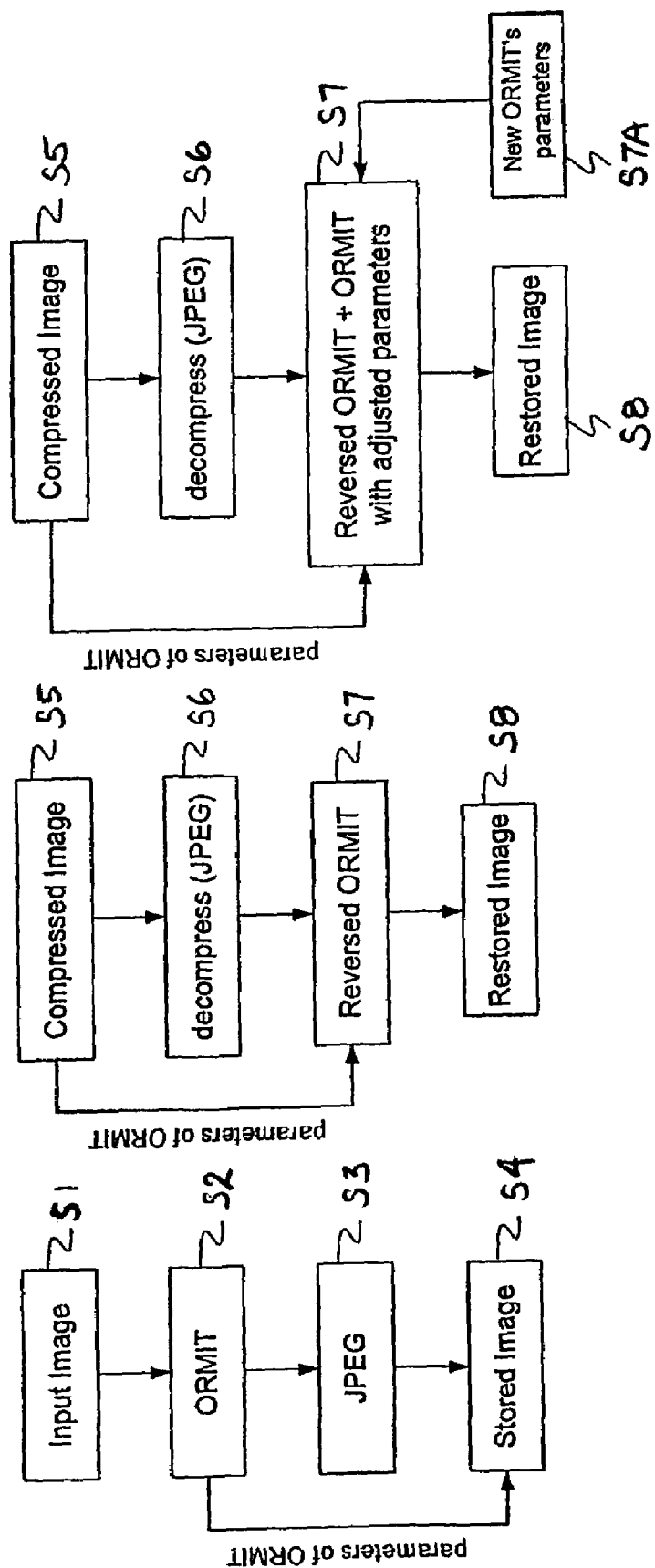
FIG. 15 shows flow diagrams representing: (a) the procedure of the combined ORMIT-JPEG compression, (b) and (c) the procedures of decompression. In the case (c) the new parameters of the ORMIT are preset at the stage of decompression.

The procedure is shown in summary in FIGS. 15(a) and 15(b):

S1. Capture source image
S2. Apply dynamic range compression (e.g. ORMIT transform)
S3. Apply lossy compression (e.g. JPEG compression)
S4. Attach information describing step (S2) to header of JPEG image
S5. Transmit image
S6. Decompress JPEG image
S7. Decode header and reverse step (S2): dynamic range expansion (reverse ORMIT)
S8. Output image An example illustrating the advantages of the ORMIT transform is now described. The size of the source image was 401 kB. Lossy compression of the source image resulted in an image having a file size of 22 kB. Post-processing of the compressed image, in this case brightness amplification, led to the bright area in an originally dark of the image. It was clear that the upper part of the image was well-preserved, whereas the lower part was of low quality.

Next, the source image was first transformed by the ORMIT transform. Compressing this image by JPEG at the same quality setting yielded an image having a file size of 28 kB—i.e. similar to the JPEG-only compressed file. To transmit this image, we added a 100 byte header file comprising the parameters of the ORMIT transform. Subsequent JPEG decompression and reversing the ORMIT transform using these parameters, led to the restored image. Post-processing of the restored image, in this case by brightness amplification in the selected originally dark region, provided a higher quality image in the dark region.

Comparing the resultant images, we concluded that the ORMIT pre-processed image contains far more useful information in the dark region than the simple JPEG image, whereas the file sizes of the two images are comparable.

Even using JPEG-only compression of the source image with a higher JPEG quality factor is less effective. The higher quality factor file had a size of 53 kB, almost twice as large as the ORMIT-enhanced image, and even at this level of quality less information is retained in the dark region (shown in brightness amplification in the lower box) than with ORMIT pre-processing.

The reason for the result is that JPEG (or JPEG2000) uses a quality criterion which is based on the root mean square deviation between input and compressed images, and does not discriminate between dark areas (where the human eye is most sensitive to contrast) and bright areas (where the eye is least sensitive). Application of dynamic range compression increases the efficiency of JPEG or other lossy compression by preserving information in dark regions.

A further application is therefore the use of dynamic range compression to decrease the file size of a JPEG or similar image, while retaining the same visual appearance.

A further important application of strong dynamic range compression is as follows. Standard image formats use 8 bits per colour, whereas image capture devices can record e.g. 16 bits/colour. By applying dynamic range compression, e.g. the ORMIT transform, followed by conversion to 8 bits/colour, and then reversing the transformation at the point of image reconstruction, allows e.g. 16 bit images to be transmitted using 8 bit image formats. An example is the digital camera Agfa ePhoto1280. This produces (after CCD and ADC) a 10 bit/colour image, from which only 8 bit/colour are preserved by subsequent JPEG compression. Thus dynamic range compression, and particularly the ORMIT transform, allow the complete use of the full potential of the high-precision hardware of such cameras.

For the above procedure to be efficient, it is preferable that the algorithm used for dynamic range compression can be described using a small number of parameters (i.e., such a small number is required to reverse the transform). Because the ORMIT transform uses orthogonal functions, it satisfies this criterion.

Optimisation of Dynamic Range at Point of Image Reconstruction

A farther feature of the ORMIT transform is that, providing the parameters of the transformation have been appended to the image (see FIG. 15(c)), the strength of the transform, and therefore the degree of dynamic range compression, can be varied according to the capabilities of the display device. In the case of the ORMIT transform, this can be done with minor additional computation (much less than that used to perform the initial transformation)

Figure 16:
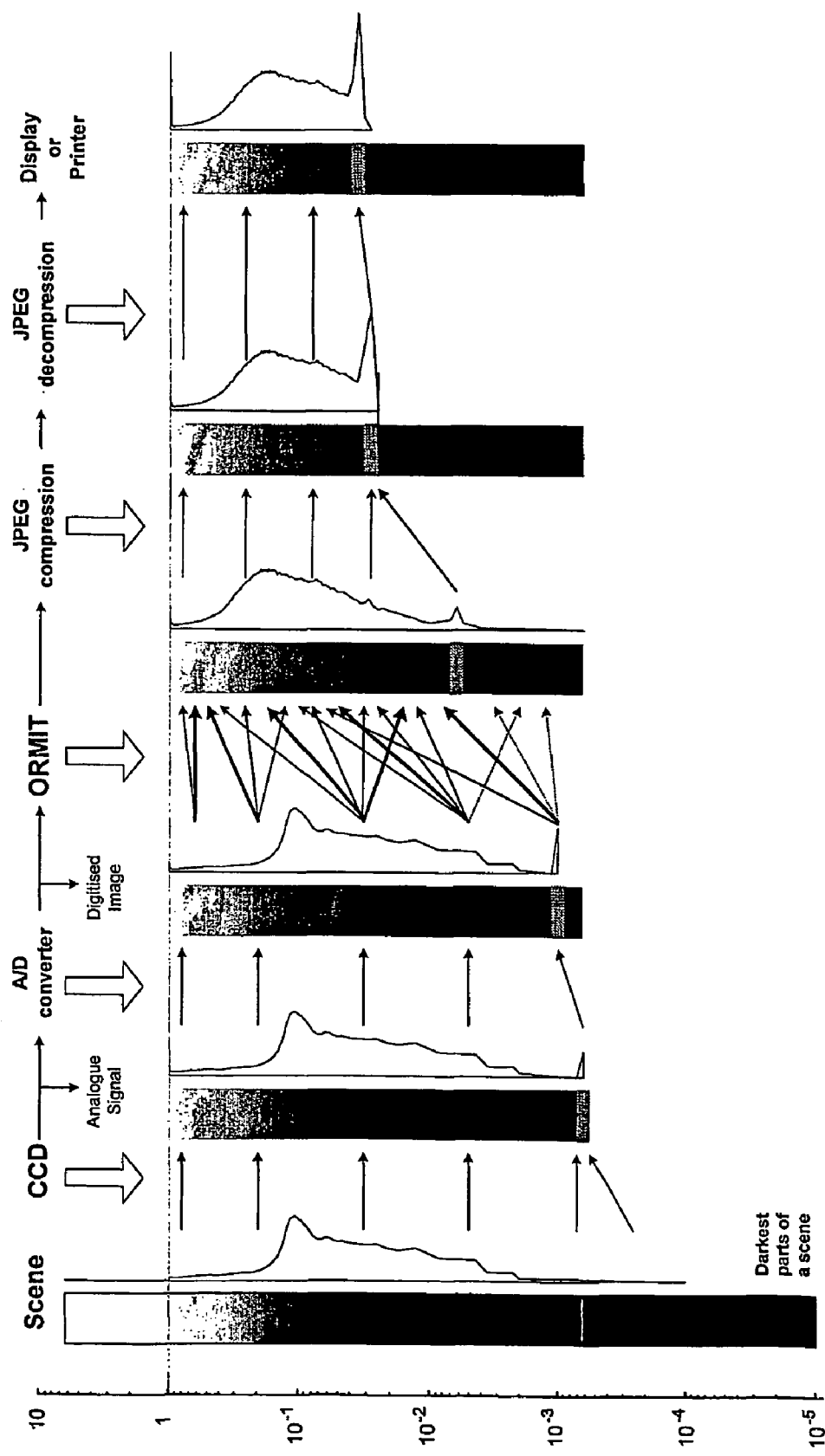
FIG. 16 schematically illustrates the dynamic range, and brightness distribution, at different stages of image processing.

An example is the transmission of a JPEG-encoded image, pre-processed using the ORMIT transform, and appended with the parameters of the ORMIT transform as in FIG. 15(a). These could be accommodated in the header of the file according to the standard file specifications. There are various options for outputting this image, e.g. CRT screen, LCD screen, low-quality printer, high-quality printer. Each output device has a different effective dynamic range. A similar scheme may be used as in FIG. 15(b) except at the stage of reproduction, a further step S7A is added wherein the parameters of the reverse ORMIT transform are varied at the output device to optimize the dynamic range of the image with that of the output device. FIG. 16 shows the dynamic range, and brightness distributions, at various stages of image processing—the dynamic range at the output device may be varied by use of a variable ORMIT transform at the output device.

Another example is the transmission of an image without any lossy compression but again with ORMIT parameters appended to allow optimisation of the image according to the characteristics of the display/reproduction device. Another example is the application of the ORMIT transform before lossy compression of digital video (e.g. MPEG). This would be especially useful if the movie is to be displayed on e.g. a LCD screen, which has a narrower dynamic range than a CRT screen. A further example is the conversion of movies shown at cinemas onto DVD or video, where the ORMIT transform can be used to compress from the (very wide) dynamic range of a cinema to the much narrower range of a CRT or LCD screen. The strength of transform can be controlled in real time at the point of display.

Negative "Strength" of Transform

The ORMIT transform with negative "strength" of transform $\alpha<0$ can be used as an efficient algorithm of noise suppression. Such an algorithm could be used for example for real time retouching of images of human faces so that e.g. wrinkles will much less visible.

Applications and Advantages

Possible applications of the ORMIT transform include software for digital still images (standalone, scanner's software, printer's software) and video improvement; digital still and video cameras; TV-sets and LCD displays; printers. Implementations in the analogue domain include analogue video cameras; super-fast video cameras; high quality digital video cameras; security cameras (e.g. small, cheap and low power consuming); X-ray and night-vision enhancement equipment. Other applications for the algorithm include hazy scene enhancement; multiple exposure based image synthesis for huge dynamic range scenes; advanced colour correction procedures; universal image improvement for TV-sets and displays.

Advantages of the ORMIT transform include:

1. It is a high quality image improvement algorithm (smooth in space and in brightness domain) combining efficient dynamic range compression with natural look of the transformed images;

2. The digital implementation of the algorithm can be very fast (the fast implementation of the LPF based on bilinear interpolation and the Discrete Cosine Transform is described above);

3. The algorithm can be implemented in purely analogue hardware.

Other features of the ORMIT transform (its reversibility and small amount of parameters describing the transform, the case negative "strength" of transform, etc) are described above.

Advantages of the ORMIT over local histogram equalisation (adaptive histogram equalisation) include:

1. High computational efficiency.

2. Smoothness in the space domain (the polynomial version of the ORMIT transform is smooth in the brightness domain too), whereas in many cases a rectangular window around each pixel is used for histogram equalisation in this window, thus such transforms cannot be considered as spatially smooth. The non-smoothness of a transform could increase the noise and artifacts of transformed images.

Figure 12A:
FIG. 12(a) is the initial image, 12(b) is the local histogram equalized image, and 12(c) is the ORMIT-transformed image.
Figure 12B:
FIG. 12 shows images comparing results of different image transformations.
Figure 12C:

The asymmetry of the transform in terms of its adaptivity in "bright" and "dark" areas of image. The influence of the ORMIT transform in dark areas is much higher than in bright, which seems to be closer to the behavior of the human eye, thus the transformed images look much more natural than images enhanced by a local histogram equalization (adaptive histogram equalization) procedure (see FIG. 12). FIG. 12 shows images comparing results of different image transformations; FIG. 12(a) is the initial image, 12(b) is the local histogram equalized image, and 12(c) is the ORMIT-transformed image. The ORMIT is an algorithm adjusting its mapping function (not just stretching the range of intensities as it is, for example, in the case of the Homomorphic Filtering of the Retinex™ algorithm) adaptively to different parts of an image. Thus the ORMIT transform is a spatially nonuniform transform. This is a difference of this algorithm from the family of histogram-modifying algorithms, which are described by a formula $I'=\Theta(I)$.

The ORMIT transform mapping function can be described by a following formula: $I'(x,y)=\eta(I(x,y), x, y)$, where $\tilde{\Theta}$ may be a continuous (or even smooth) function both in spatial (x, y) and in brightness I domains, that is:

$$\left.\frac{\partial \Theta}{\partial x}\right|_{y,I} < C_x, \left.\frac{\partial \Theta}{\partial y}\right|_{x,I} < C_y, \left.\frac{\partial \Theta}{\partial I}\right|_{x,y} < C_I,$$

where $C_x$, $C_y$ and $C_I$ are some constants. This is a difference of the ORMIT transform from other local-histogram equalising algorithms, which usually are not smooth in the brightness and/or spatial domains. This results in appearance of artefacts in the transformed image.

Another difference is that the ORMIT transform is an orthogonal transform, thus it may be embodied in a relatively computationally efficient form, whereas low computational intensity is a known drawback of pre-existing local histogram equalising algorithms.

One of the properties of the ORMIT transform is the adjustability of strength of transform, that is the output image is a mixture of a maximally equalised image with the input image, thus the compromise between the natural look of the transformed image and the dynamic compression can be established by the user. Another difference of the ORMIT from local histogram equalising algorithms is that ORMIT can have different spatial nonuniformity for different domains of brightness of a picture. For example the transformation of bright parts of an image could be less spatially nonuniform than the transformation of dark parts. This provides for much higher flexibility of the algorithm and allows the creation of very high quality image improvement algorithms.

Another advantageous feature of the ORMIT is its reversibility. Furthermore, the ORMIT transformation may be entirely described by a small amount of data (normally less that 100 Bytes).

Further Embodiments

The above embodiments are to be understood as illustrative examples of the invention only. Further embodiments of the invention are envisaged. It is to be understood that any feature described in relation to one embodiment may also be used in other of the embodiments. Furthermore, equivalents and modifications not described above may also be employed without departing from the scope of the invention, which is defined in the accompanying claims.

The invention claimed is:

1. An image processing method comprising a transformation step of processing an input image signal to generate an adjusted output image signal, wherein the intensity values I(x,y) for different positions (x,y) of an image are adjusted to generate an adjusted intensity value $I_{out}(x,y)$ in accordance with:

$$I_{out}=\Sigma_{i=0}^{N}\alpha_i(I)LPF_{\Omega_i}[P_i(F(I))]\cdot Q_i(F(I))+\beta(I),$$

where the $P_i(\gamma)$ form an orthogonal basis of functions of $\gamma$ defined in a range $0<\gamma<1$, the $Q_i(..)$ are antiderivatives of the $P_i(..)$: the $Q_i(F(I))=\int_0^{F(i)}=P_i(\eta)d\eta$ or approximations thereto, the $LPF_\Omega[..]$ is an operator of low-pass spatial filtering; the $\Omega_i$ are cut-off frequencies of the low-pass spatial filter, the F(..) is a weighting function, the $\alpha_i(I)$ are $i^{th}$ members of a transformation step strength function, the $\beta(I)$ is a strength function, the i and N are positive constants and the $\eta$ is a variable.

2. The image processing method according to claim 1, wherein the $\beta(I)$ is not equal to zero.

3. The image processing method according to claim 1, wherein the $\Omega_i$ is different for different i such that the transformation step has a different degree of spatial nonuniformity in different brightness domains.

4. The image processing method according to claim 1, wherein $$I_{out}=\alpha\cdot\Sigma_{i=0}^{N}LPF_{\Omega_i}[P_i(F(I))]\cdot Q_i(F(I))+(1+\alpha)I,$$

where the $\alpha$ is a transformation step strength value such that $0<\alpha<1$.

5. The image processing method according to claim 1, wherein said orthogonal basis of functions are polynomial functions.

6. The image processing method according to claim 5, wherein said orthogonal basis of functions are Legendre polynomial functions.

7. The image processing method according to claim 4, wherein said orthogonal basis of functions are piecewise linear mapping functions.

8. The image processing method according to claim 4, wherein said weighting function F(I) is selected to provide a greater strength of transformation step in dark regions than in light regions.

9. The image processing method according to claim 8, wherein said weighting function varies substantially in accordance with:

$$F(I) = \frac{\log(I + \Delta) - \log(\Delta)}{\log(1 + \Delta) - \log(\Delta)},$$

where the Δ is a dark and light asymmetry parameter, and where Δ<1.

10. The method according to claim 1, wherein the transformation step is representable by a transfer function which varies in shape nonlinearly in a spatial domain.

11. The method of claim 1, further comprising a method of compressing an image signal, comprising conducting reversible dynamic range compression according to the method of claim 1, and lossy data compression during an image data compression procedure to generate compressed image data.

12. The method according to claim 11, comprising conducting a reversible dynamic range compression algorithm followed by a lossy image data compression algorithm.

13. The method according to claim 11, comprising generating parameters relating to the dynamic range compression algorithm, and storing the generated parameters in combination with the compressed image data.

14. The method of claim 1, further comprising a method of decompressing compressed image data, comprising conducting decompression, corresponding to a lossy compression, and a reverse of the dynamic range compression according to the method of claim 1 in combination to provide a decompressed image signal.

15. The decompressing method according to claim 14, comprising reading parameters relating to said reversible dynamic range compression algorithm from data accompanying said compressed image data, and using said parameters in said reverse dynamic range compression algorithm.

16. The decompressing method according to claim 14, comprising conducting said reverse dynamic range compression using one or more parameters selected in dependence on an image display method to be utilized.

17. A method according to claim 11, wherein said dynamic range compression algorithm comprises processing an input image signal to generate an adjusted output image signal, wherein the intensity values I(x,y) for different positions (x,y) of an image are adjusted to generate an adjusted intensity value $I_{out}(x,y)$ in accordance with:

$$I_{out} = \Sigma_{i=0}^{N} \alpha_i(I) LPF_{\Omega_i}[P_i(F(I))] \cdot Q_i(F(I)) + \beta(I),$$

where the $P_i(\gamma)$ form an orthogonal basis of functions of γ defined in a range 0<γ<1, the $Q_i(..)$ are antiderivatives of the $P_i(..)$: the $Q_i(F(I)) = \int_0^{F(I)} P_i(\eta) d\eta$ or approximations thereto, the $LPF_\Omega[..]$ is an operator of low-pass spatial filtering; the $\Omega_i$ are cut-off frequencies of the low-pass spatial filter, the F(..) is a weighting function, the $\alpha_i(I)$ are $i^{th}$ members of a transformation step strength function, the β(I) is a strength function, the i and N are positive constants and the η is a variable.

18. A computer program adapted to implement the method of claim 11.

19. An image processing method comprising the step of processing an input image signal to generate an adjusted output image signal, wherein the intensity values (I) for different positions of an image are adjusted to generate an adjusted intensity value (I') in accordance with:

$$I' = \sum_{i=0}^{\infty} \langle P_i(I) \rangle \int_0^I P_i(\eta) d\eta$$

where $P_i(..)$ defines a basis of orthogonal functions and the operator ⟨..⟩ means an arithmetic mean or mathematical expectation value for the image, i is a positive constant and the η is a variable.

20. The image processing method according to claim 19, wherein the input image signal is a video signal represented by I(t) and the arithmetic mean is:

$$\langle P_i(I) \rangle = \frac{1}{T} \int_0^T P_i(I) dt.$$

21. The image processing method according to claim 19, wherein said orthogonal functions comprise a basis of square functions, or approximations thereto.

22. The image processing method according to claim 19, wherein said orthogonal functions comprise Legendre polynomials, or approximations thereto.

23. An image processing device comprising a processor adapted to carry out the method of claim 1.

\* \* \* \* \*

UNITED STATES PATENT AND TRADEMARK OFFICE
CERTIFICATE OF CORRECTION

PATENT NO. : 7,302,110 B2  Page 1 of 1
APPLICATION NO. : 10/476587
DATED : November 27, 2010
INVENTOR(S) : Chesnokov It is certified that error appears in the above-identified patent and that said Letters Patent is hereby corrected as shown below:

Item (76) should read (75) on title page

On Title Page Item (73) Add:

(A) Name of Assignee: Apical Limited       (B) Residence: London, United Kingdom Signed and Sealed this Sixteenth Day of November, 2010

David J. Kappos
*Director of the United States Patent and Trademark Office*